(12) United States Patent
Chu et al.

(10) Patent No.: US 10,084,856 B2
(45) Date of Patent: Sep. 25, 2018

(54) METHOD AND APPARATUS FOR LOCATING SERVICES WITHIN PEER-TO-PEER NETWORKS

(75) Inventors: Thomas P. Chu, Englishtown, NJ (US); Ramesh Nagarajan, Princeton Junction, NJ (US)

(73) Assignee: WSOU Investments, LLC, Los Angeles, CA (US)

( * ) Notice: Subject to any disclaimer, the term of this patent is extended or adjusted under 35 U.S.C. 154(b) by 1690 days.

(21) Appl. No.: 12/640,072

(22) Filed: Dec. 17, 2009

(65) Prior Publication Data
US 2011/0153634 A1    Jun. 23, 2011

(51) Int. Cl.
*G06F 17/30* (2006.01)
*H04L 29/08* (2006.01)

(52) U.S. Cl.
CPC .......... *H04L 67/104* (2013.01); *H04L 67/107* (2013.01); *H04L 67/16* (2013.01); *H04L 67/1065* (2013.01)

(58) Field of Classification Search
CPC . H04L 67/107; H04L 67/104; H04L 67/1059; H04L 67/1065; H04L 67/16
See application file for complete search history.

(56) References Cited

U.S. PATENT DOCUMENTS

| | | |
|---|---|---|
| 5,819,258 A | 10/1998 | Vaithyanathan et al. |
| 7,487,239 B2 | 2/2009 | Childress et al. |
| 7,516,116 B2 * | 4/2009 | Shen et al. |
| 7,680,130 B2 * | 3/2010 | Ogawa ........................ 370/400 |
| 7,805,448 B2 * | 9/2010 | Andrzejak et al. .......... 707/747 |
| 7,975,035 B2 | 7/2011 | Popescu et al. |

(Continued)

FOREIGN PATENT DOCUMENTS

| | | |
|---|---|---|
| CN | 101259755 A | 4/2008 |
| CN | 101207531 A | 6/2008 |

(Continued)

OTHER PUBLICATIONS

I. Stoica et al., "Chord: A Scalable Peer-to-Peer Lookup Service for Internet Applications," SIGCOMM'01, Aug. 27-31, 2001, San Diego, CA.

(Continued)

*Primary Examiner* — Shew-Fen Lin
(74) *Attorney, Agent, or Firm* — Sean D. Burdick

(57) ABSTRACT

A capability is provided for supporting a service location capability in a peer-to-peer network (P2P), such as a Chord network or other P2P network. In one embodiment, a method for locating a service within a P2P network is provided. The P2P network includes a plurality of nodes, including a target node which performs the method for locating the service within the P2P network. The target node includes a search table including a plurality of entries identifying a respective plurality of nodes of the P2P network. The method includes detecting a request to search for the service within the P2P network and initiating, toward at least one of the nodes of the search table, a service search request. The service search request is a request to identify at least one node of the P2P network that supports the service. The service search request includes information indicative of the service and a search range for use by the node receiving the service search request.

27 Claims, 9 Drawing Sheets

(56) References Cited

U.S. PATENT DOCUMENTS

| | | | |
|---|---|---|---|
| 7,978,631 | B1 | 7/2011 | Abdelaziz et al. |
| 8,014,321 | B2 | 9/2011 | Kakivaya et al. |
| 2002/0038360 | A1 | 3/2002 | Andrews et al. |
| 2003/0158839 | A1 | 8/2003 | Faybishenko et al. |
| 2004/0088369 | A1 | 5/2004 | Yeager et al. |
| 2005/0021617 | A1 | 1/2005 | Rusitschka |
| 2005/0060406 | A1* | 3/2005 | Zhang ............... H04L 12/2602 709/225 |
| 2005/0114862 | A1 | 5/2005 | Bisdikian et al. |
| 2005/0204042 | A1* | 9/2005 | Banerjee et al. ........... 709/226 |
| 2005/0216170 | A1 | 9/2005 | Heinrichs-Bartscher |
| 2006/0007942 | A1* | 1/2006 | Ogawa ........................ 370/400 |
| 2007/0271297 | A1 | 11/2007 | Jaffe et al. |
| 2007/0288638 | A1* | 12/2007 | Vuong et al. ................ 709/226 |
| 2008/0043634 | A1* | 2/2008 | Wang ................... H04L 67/104 370/252 |
| 2008/0177767 | A1 | 7/2008 | Lin et al. |
| 2008/0177873 | A1 | 7/2008 | Ni et al. |
| 2008/0183891 | A1 | 7/2008 | Ni et al. |
| 2008/0275969 | A1 | 11/2008 | Saba |
| 2008/0281950 | A1 | 11/2008 | Wald et al. |
| 2009/0006645 | A1 | 1/2009 | Cui et al. |
| 2009/0083390 | A1 | 3/2009 | Abu-Ghazaleh et al. |
| 2009/0192999 | A1* | 7/2009 | Wang .............................. 707/3 |
| 2010/0095009 | A1* | 4/2010 | Matuszewski et al. ...... 709/228 |
| 2010/0202298 | A1* | 8/2010 | Agarwal et al. .............. 370/252 |
| 2010/0241708 | A1 | 9/2010 | Zuckerman et al. |
| 2011/0066591 | A1 | 3/2011 | Moyne et al. |
| 2012/0197962 | A1* | 8/2012 | Maenpaa et al. ............ 709/201 |
| 2012/0221646 | A1 | 8/2012 | Ciminiera et al. |
| 2012/0221647 | A1 | 8/2012 | Ciminiera et al. |
| 2012/0294148 | A1 | 11/2012 | Detwiler et al. |
| 2013/0124474 | A1 | 5/2013 | Anderson |
| 2013/0138688 | A1 | 5/2013 | Anderson |
| 2013/0152078 | A1 | 6/2013 | Arcilla et al. |

FOREIGN PATENT DOCUMENTS

| | | |
|---|---|---|
| CN | 101257396 A | 9/2008 |
| CN | 101374087 A | 2/2009 |
| CN | 101394423 A | 3/2009 |
| JP | 2004-258994 | 9/2004 |
| JP | 2005-094773 | 4/2005 |
| JP | 2008-204299 | 9/2008 |
| JP | 2008-234563 | 10/2008 |

OTHER PUBLICATIONS

I.Stoica et al., "Chord: A Scalable Peer-to-Peer Lookup Service for Internet Applications," Jan. 10, 2002.
I.Stoica et al., "Chord: A Scalable Peer-to-Peer Lookup Protocol for Internet Applications," IEEE/ACM Transactions on Networking, vol. 11, Issue 1, Feb. 2003.
A.Rowstron and P. Druschel, "Pastry: Scalable Decentralized Object Location and Routing for Large-Scale Peer-to-Peer Systems," Proceedings of 18$^{th}$ IFIP/ACM International Conference on Distributed Systems Platforms. Heidelberg, Germany, Nov. 2001.
B. Zhao et al., "Tapestry: A Resilient Global-Scale Overlay for Service Deployment," IEEE Journal on Selected Areas in Communications, vol. 22, No. 1, Jan. 2004.
S. Ratnasamy et al., "A Scalable Content Addressable Network," Proceeding SIGCOMM'01, Aug. 27-31, 2001, San Diego, CA.
International Search Report and the Written Opinion of the International Searching Authority, or the Declaration, dated Mar. 1, 2011 in PCT/US2010/058460; Alcatel-Lucent USA Inc., Applicant; 10 pages.
International Search Report and the Written Opinion of the International Searching Authority, or the Declaration, dated Feb. 24, 2011 in PCT/US2010/058490; Alcatel-Lucent USA Inc., Applicant; 11 pages.
X. Bai et al., "ICN: Interest-Based Clustering Network," Proceedings of the Fourth Int. Conf. on Peer-to-Peer Computing (P2P'04), Aug. 25, 2004.
Yuh-Jzer Joung, "Approaching Neighbor Proximity and Load Balance for Range Query in P2P Networks," Computer Networks vol. 52, No. 7, May 15, 2008, pp. 1451-1472.
W. Yin et al., "R-Chord: A Distributed Similarity Retrieval System with RPCID," Proceedings of IC-NIDC2009, Nov. 6, 2009, pp. 393-399.
Y. Zhang et al., "DHT-Based Range Query Processing for Web Service Discovery," 2009 IEEE Int. Conf. on Web Services, 2009 IEEE, Jul. 6, 2009, pp. 477-484.
Z. Li et al., "Fast and Proximity-Aware Multi-Source Overlay Multicast Under Heterogeneous Environment," Computer Communications, vol. 32, No. 2, Feb. 12, 2009, pp. 257-267.
S. Sioutas et al., "Dynamic Web Service Discovery Architecture Based on a Novel Peer Based Overlay Network," The Journal of Systems and Software vol. 82, No. 5, May 1, 2009, pp. 809-824.
Bin Cui, et al., "Linking Identical Neighborly Partitions for Efficient High-Dimensional Similarity Search in Unstructured Peer-to-Peer Systems," Distributed and Parallel Databases vol. 26, No. 2-3, Aug. 19, 2009, pp. 207-229.
Salter et al., "An optimized two-tier P2P architecture for contextualized keyword searches," Future Generation Computer Systems 23.2, Feb. 2007, pp. 241-251.
Triantafillou, "Peer-to-peer network architectures: The next step (harnessing the symbiosis of altruism and selfishness)", SIGCOMM Proceedings of Workshop on Future Directions in Network Architectures, 2003, Aug. 2003, 25-29.
Triantafillou, "PLANES: The Next Step in Peer-to-Peer Network Architectures," SIGCOMM, Proceedings of Workshop on Future Directions in Network Architectures, 2003.
Salter, "An Efficient Reactive Model for Resource Discovery in DHT-based Peer-to-peer Networks," Department of Computing, School of Electronics and Physical Sciences, University of Surrey, Oct. 2006.
Antonopoulos et al., "A Multi-Ring Method for Efficient Multi-Dimensional Data Lookup in P2P Networks," Proceedings of the 2005 International Conference on Foundations of Computer Science, FCS 2005, Las Vegas, Nevada, USA, Jun. 27-30, 2005.
Rowstron et al., "Pastry: Scalable, decentralized object location, and routing for large-scale peer-to-peer systems," Proceedings of the 18$^{th}$ IFIP/ACM International Conference on Distributed Systems Platforms (Middleware 2001), Nov. 2001.
Ntarmos et al., "AESOP: Altruism-Endowed Self-organizing Peers," DBISP2P'04 Proceedings of the Second International Conference on Databases, Information Systems, and Peer-to-Peer Computing, 2005, pp. 151-165.
Madruga et al., "A Distributed Proxy Architecture for Service Discovery in Peer-to-Peer Networks," Intelligence in Communication Systems IFIP—the International Federation for Information Processing, vol. 190, 2005, pp. 201-210.
Kim et al., "Scalable Ultrapeer-Based DHT Protocol for File Sharing," International Symposium on Collaborative Technologies and Systems, CTS'09 , IEEE, May 18-22, 2009.
Karger et al., "Diminished Chord: A Protocol for Heterogeneous Subgroup Formation in Peer-to-Peer Networks," *International Workshop on Peer-to-Peer Systems (IPTPS '04)*, San Diego, Feb. 2004, pp. 288-297.
Freedman et al., "Sloppy Hashing and Self-Organizing Clusters," Peer-to-Peer Systems II Lecture Notes in Computer Science, vol. 2735, 2003, pp. 45-55.
Exarchakos et al., "Semantic Cooperation and Node Sharing Among P2P Networks," Proceedings of the Sixth International Network Conference (INC 2006), Plymouth, UK, 2006, pp. 1-8.
Antonopoulos et al., "Towards an Intelligent Agent Model for Efficient Resource Discovery in Grid Environments," Proceedings of the IADIS International Conference on Applied Computing, Lisbon, Portugal, Mar. 23-26, 2004.

(56) References Cited

OTHER PUBLICATIONS

Ajitabh, "Exploiting Semantic Locality to Improve Peer-to-Peer Search Mechanisms", Rochester Institute of Technology, Department of Computer Science, 2006, pp. 1-65.
Boukhelef et al., "Multi-ring Infrastructure for Content Addressable Networks," On the Move to Meaningful Internet Systems, OTM 2008, Lecture Notes in Computer Science, vol. 5331, 2008, pp. 193-21.
English Translation of Notice of Reason for Refusal for Japanese Patent Application Serial No. 2012-544578, dated Oct. 8, 2013, consists of 3 unnumbered pages.
English Translation of Notice of Preliminary Rejection for Korean Patent Application Serial No. 10-2012-7018264, dated Jun. 21, 2013, pp. 1-6.
English Translation of Notice of Rejection for Japanese Patent Application Serial No. 2012-544577, dated Oct. 1, 2013, consists of 4 unnumbered pages.
First Office Action from corresponding Chinese Application No. 2010800563177, dated May 27, 2014, pp. 1-9.
Second Office Action from corresponding Chinese Application No. 2010800575973, dated Jan. 15, 2015, pp. 1-10.
Feb. 26, 2014, Notice of Preliminary Rejection in KR Patent Application No. 2012-7015634, Alcatel Lucent, Applicant, 4 pages.
1$^{st}$ Office Action in corresponding Chinese Application No. 201080057597.3, dated Apr. 23, 2014, pp. 1-26.
Final Rejection from corresponding Korean Application No. 2012-7015634, dated Aug. 8, 2014, pp. 1-5.
Schmidt, C., et al., "Enabling Flexible Queries with Guarantees in P2P Systems," *IEEE Internet Computing*, May-Jun. 2004, pp. 19-26, IEEE Computer Society.
Kalander, R., "Evaluating Locality of Multi Attribute Queries in Chord," Master of Science Thesis, *Royal Institute of Technology*, 2006, pp. 1-50, Stockholm, Sweden.
Houyou, A. M., et al., "Performance Evaluation of Overlay-based Range Queries for Mobile Systems," Fourth EuroFGI Workshop on Wireless and Mobility, Jan. 16-18, 2008, Barcelona, Spain.
Mislove et al., "Providing Administrative Control and Autonomy in Structured Peer-to-Peer Overlays," Proceedings of the Third International Conference on Peer-to-Peer Systems (IPTPS04), Feb. 26, 2004.
Schmidt, Cristina S., "Flexible Information Discovery with Guarantees in Decentralized Distributed Systems," Rutgers, The State University of New Jersey, Oct. 2005, 149 pages.
Castro, Paul et al., "CLASH: A Protocol for Internet-Scale Utility-Oriented Distributed Computing," Proc. 24*th* Intl Conf. on Distributed Computing Systems (ICDCS), Mar. 24, 2004.
Schmidt, Cristina et al., "Squid: Enabling search in DHT-based systems," J. Parallel Distrib. Comput. 68 (2008), Jul. 2008, pp. 962-975.

\* cited by examiner

200

○ INACTIVE NODES
◉ ACTIVE NODES
● ACTIVE NODES THAT SUPPORT SERVICE

METHOD AND APPARATUS FOR LOCATING SERVICES WITHIN PEER-TO-PEER NETWORKS

CROSS-REFERENCE TO RELATED APPLICATIONS

This application is related to U.S. patent application Ser. No. 12/640,049, filed Dec. 17, 2009, entitled "METHOD AND APPARATUS FOR DECOMPOSING A PEER-TO-PEER NETWORK AND USING A DECOMPOSED PEER-TO-PEER NETWORK," which is hereby incorporated by reference herein in its entirety.

FIELD OF THE INVENTION

The invention relates to the field of peer-to-peer (P2P) networks and, more specifically but not exclusively, to locating services within P2P networks.

BACKGROUND

File sharing has been a focus of intense research and grass roots usage for some time. File sharing is enabled by file sharing approaches specifically designed for that purpose and implemented as different file sharing systems having file sharing protocols associated therewith. A number of different file sharing systems have been implemented, beginning with Napster and then proceeding through a number of generations of different file sharing systems, such as gnutella, Kazaa, eDonkey, Winny, and BitTorrent. In addition to these file sharing systems, new systems, such as Share and Perfect Dark, also are being developed. Collectively, these file sharing systems and associated protocols are referred to as peer-to-peer (P2P) file-sharing systems/protocols or, more simply, P2P file sharing applications. Furthermore, in addition to P2P file sharing applications, a new class of P2P applications, P2P television (P2PTV), is emerging which, architecturally, are different than the P2P file-sharing applications.

The popularity of P2P file sharing is evident from recent traffic studies. For example, a recent traffic study, by Ellacoya Networks, of one million broadband users within the United States, indicates that the breakdown of the major traffic types by volume is as follows: web (HTTP)—46%; peer-to-peer (P2P)—37%; newsgroup—9%; non-HTTP streaming video—3%; gaming—2%; voice-over-IP (VoIP)—1%; and other—1%. The main reason for the high volume of HTTP traffic is embedded video streaming traffic, such as traffic from YouTube, which accounts for 9.8% of the total traffic in above-mentioned study). However, P2P file sharing still is responsible for a large percentage of the traffic and, with the emergence of P2PTV, the amount of traffic is expected to increase drastically.

A vast majority of the existing P2P applications involve file sharing; however, a majority of the existing P2P applications involving file sharing, at least initially, were not entirely peer-to-peer. Rather, most existing P2P applications initially utilized a central server to coordinate activity between members of the P2P network. For example, in bitTorrent, while downloading of different pieces of information was peer-to-peer, a centralized server, referred to as the tracker in bitTorrent, was used to coordinate the activity of the bitTorrent application. Similarly, for example, many other P2P applications involving file sharing also had similar characteristics, such as Napster and eDonkey. The use of a central server, however, makes existing P2P applications vulnerable to congestion and failures and, further, makes existing P2P applications an attractive target to security threats.

Disadvantageously, however, while existing P2P applications support file sharing, existing P2P applications do not support the ability to search for a service.

SUMMARY

Various deficiencies in the prior art are addressed by embodiments that support a service location capability in a peer-to-peer (P2P) network, such as a Chord network or other suitable P2P network.

In one embodiment, a method for locating a service within a P2P network is provided. The P2P network includes a plurality of nodes, including a target node which performs the method for locating the service within the P2P network. The target node includes a search table including a plurality of entries identifying a respective plurality of nodes of the P2P network. The method includes detecting a request to search for the service within the P2P network and initiating, toward at least one of the nodes of the search table, a service search request. The service search request is a request to identify at least one node of the P2P network that supports the service. The service search request includes information indicative of the service and a search range for use by the node receiving the service search request.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A service location capability is provided for use in locating a service within a peer-to-peer (P2P) network.

The service location capability, in accordance with one embodiment, enables a target node within a P2P network to search for the location of a particular service within the P2P network, e.g., to search for one or more other nodes of the P2P network that support the service. The service location capability reuses the existing search tables of the nodes of the P2P network to perform a service location search. A service location search initiated by a target node may be performed such that service search requests are initiated to all nodes of the search table in parallel, to all nodes of the search table in series until the service is located or the search table is exhausted, to a subset of the nodes of the search table in parallel and then to any remaining nodes of the search table in series until the service is located or the search table is exhausted, and/or using any other suitable schemes. In the service location search, each service search request sent to a node includes information indicative of the service being requested, a search range for use by the node receiving the search request and, optionally, service specific information. The service search request may include other types of information. The service location search initiated by a node will generate, at most, M search messages such that each node will receive, at most, M response messages (where M is the size, in bits, of the key space of the P2P network) and, therefore, a search over the entire P2P network will be distributed such that no single node of the P2P network is overloaded by search request and/or response messages. The service location search capability enables a node in a first P2P network to search for an object in a second P2P network by using the service location capability to identify nodes of the first P2P network that also are nodes of the second P2P network. It will be appreciated that the foregoing description is merely a general description of certain embodiments of the service location capability that is provided for purposes of introducing the service location capability and, thus, that the embodiments of the service location capability are not intended to be limited by the foregoing description.

The service location capability is primarily depicted and described herein within the context of a particular type of P2P network, namely, a Chord network. In a Chord network, a search table maintained at a node of the Chord network is referred to as a finger table, and each entry of the finger table is referred to as a finger, respectively. It will be appreciated that the principles of the service location capability may be applied to other types of P2P networks and, thus, references herein to finger tables and associated fingers may be read more generally as being references to search tables and associated entries identifying nodes.

Figure 1:
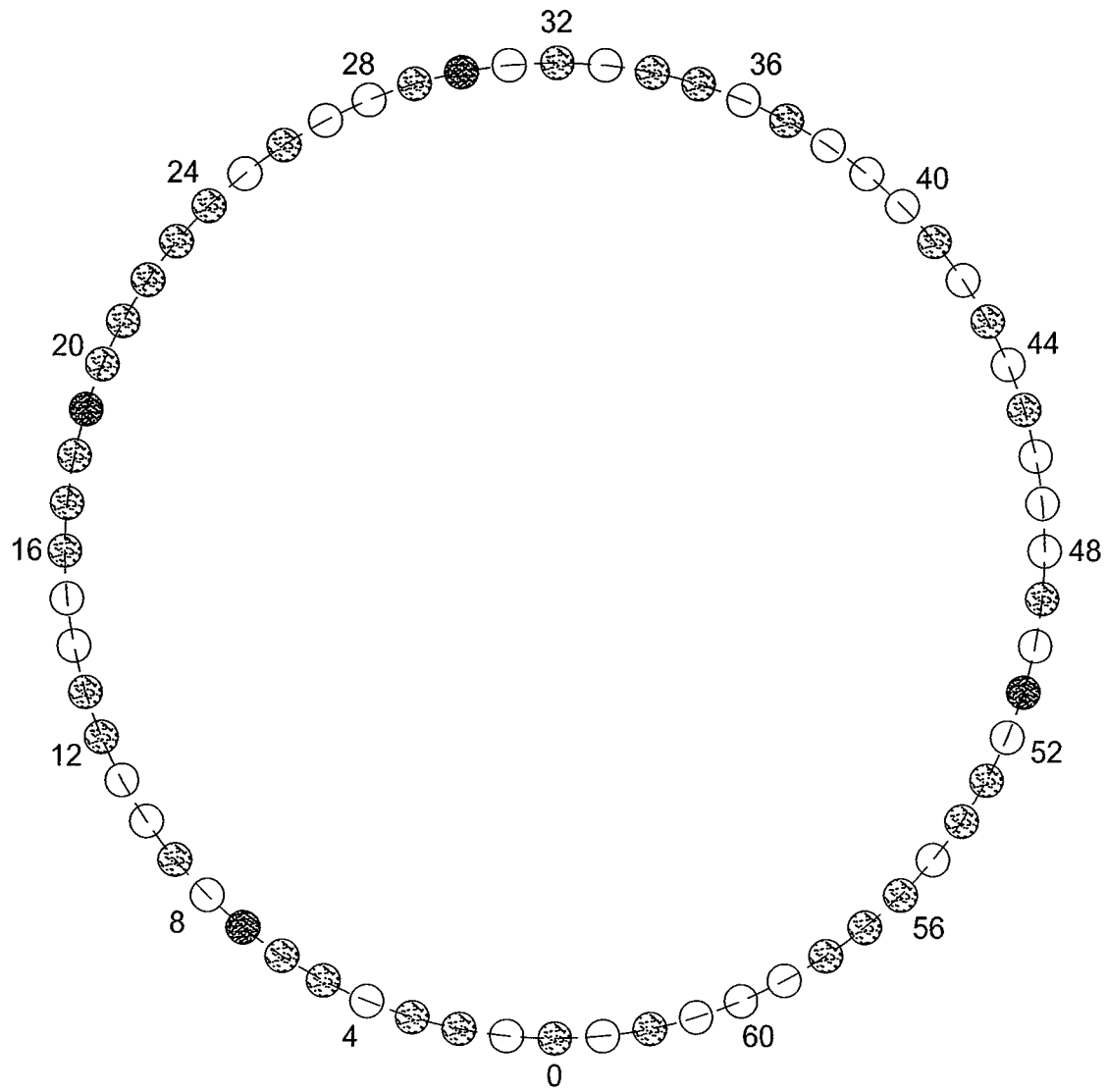
FIG. 1 depicts an exemplary Chord network.

FIG. 1 depicts a high-level block diagram of an exemplary Chord network. As depicted in FIG. 1, Chord network 100 includes a plurality of nodes 110 that are logically arranged in a ring configuration. The nodes 110 each store files which may be shared among the nodes 110. The nodes 110 also may host services which may be made available to other nodes 110. The nodes 110 include any nodes that may participate in a Chord network. For example, nodes 110 may include computers, phones, and the like. The nodes 110 each are configured to provide various functions of the service location capability.

The operation of Chord network 100 in providing the service location capability may be better understood by first considering the general operation of Chord networks in conjunction with the exemplary Chord network 100 of FIG. 1.

In Chord, the nodes of the Chord network have network connectivity via a packet-based network (e.g., such as an IP network or any other suitable network), and Chord forms an overlay network over the underlying packet-based network. The nodes of a Chord network are logically arranged in a circle in the order of the node IDs of the nodes. The node IDs of the nodes are assigned using a hash function In Chord, the number of nodes which may participate in the Chord network is based on the size of the key space (address space) of the Chord network. In general, the key space is M bits, where M may be any suitable number. For example, a typical key space used in Chord networks is provided using a 160 bit implementation, making the size of the key space equal to $2^{160}$ or ~$1.45*10^{48}$. A consistent hash function is used to map inputs to 160-bit values (i.e., to map inputs into the key space). The outputs from the hash function are mapped uniformly onto the key space. It will be appreciated that any suitable hash function may be used, such as the Secure Hash Algorithm (SHA-1), the Message-Digest Algorithm 5 (MD5), and the like. The outputs of the hash function, when mapped onto the key space, provide the set of node IDs which are used to logically arrange the nodes within the Chord network.

In Chord, the active nodes (existing nodes participating in the Chord network) and the inactive nodes (potential nodes which may join the Chord network) are arranged logically in a circle in the order of the node IDs of the nodes. Chord imposes an order in the circle, in the direction of increasing node ID values with wraparound. In the Chord network, connectivity between the active nodes of the Chord network is logical connectivity between adjacent ones of the active nodes in the circle (as inactive nodes are not connected to the Chord network and, thus, are merely potential nodes which may join the Chord network as active nodes). In this manner, from the perspective of a target active node in the Chord network, the next active node on the circle in the clockwise direction is a successor of the target active node and the next active node on the circle in the counterclockwise direction is a predecessor of the target active node.

In FIG. 1, the active nodes and the inactive nodes are displayed for purposes of clarity. In FIG. 1, the key space of the Chord network is 6 bits (or 64 nodes, which are numbered consecutively, in a clockwise fashion, from node ID 0 to node ID 63). In FIG. 1, nodes 0, 2-3, 5-7, 9, 12-13, 16-24, 26, 29-30, 32, 34-35, 37, 41, 43, 45, 49, 51, 53-54, 56-58, and 62 are active, and the remaining nodes are inactive. In FIG. 1, the logical connectivity between the active nodes of Chord network 100 indicates that node 0 is connected to node 2, node 2 is connected to node 3, node 3 is connected to node 5, and so forth, with node 62 being connected to node 0 to complete the circle. As Chord imposes an order in the circle, using increasing values in the clockwise direction with wrap around, node 2 is referred to as a successor of node 0 and node 62 is referred to as a predecessor of node 0, node 3 is referred to as a successor of node 2 and node 0 is referred to as a predecessor of node 2, and so forth.

As described herein, Chord networks support file sharing, where each file to be shared is stored on one or more of the active nodes of the Chord network. In Chord, the filename of a file is hashed into the same key space that is used for identifying the nodes of the Chord network, using the same hash function that is used for identifying the nodes of the Chord network. The hashed output from hashing the filename is the file identifier for the file. Thus, for a Chord network with key space of 160 bits, for example, the Chord network can potentially accommodate $1.45*10^{48}$ files. In Chord, a file is stored at a node that has a node ID that matches the file ID of the file if that node is active, and if that node is not active then the file is stored at the first active node having a node ID greater than the file ID.

In FIG. 1, Chord network 100 can accommodate 64 total files, which will be stored as follows: node 0 stores files 0 and 63; node 2 stores files 1 and 2; node 3 stores file 3; node 5 stores files 4 and 5; node 6 stores file 6; node 7 stores file 7; node 9 stores files 8 and 9; node 12 stores files 10, 11, and 12; node 13 stores file 13, node 16 stores file 14, 15, and 16; node 17 stores file 17; node 18 stores file 18; node 19 stores file 19; node 20 stores file 20; node 21 stores file 21; node 22 stores file 22; node 23 stores file 23; node 24 stores file 24; node 26 stores files 25 and 26; node 29 stores files 27, 28, and 29; node 30 stores file 30; node 32 stores files 31 and 32; node 34 stores files 33 and 34; node 35 stores file 35; node 37 stores files 36 and 37; node 41 stores files 38, 39, 40, and 41; node 43 stores files 42 and 43; node 45 stores files 44 and 45; node 49 stores files 46, 47, 48, and 49; node 51 stores files 50 and 51; node 53 stores files 52 and 53; node 54 stores file 54; node 56 stores files 55 and 56; node 57 stores file 57; node 58 stores file 58; node 62 stores files 59, 60, 61, and 62.

In a most basic implementation, only one copy of any given file is stored in the Chord network; however, different methods may be employed to store multiple copies of a file within the Chord network (e.g., for resiliency in the case of node failures, load-balancing, and the like).

In one embodiment, for example, multiple versions of a file may be stored in the Chord network by assigned slightly different filenames to multiple copies of the file using an agreed upon naming convention. For example, if the name of a file is "abc", an extension such as "-n" can be added to the filename representing the same file. In this example, multiple copies of the file can be stored under the names "abc", "abc-1", "abc-2", and so forth. In this manner, since the multiple file names for the "abc" file are not identical, hashing of the different file names will result in different hash outputs and, thus, different file IDs, thereby causing the multiple copies of the file to be stored in different nodes of the Chord network.

In one embodiment, for example, multiple versions of a file may be stored in the Chord network by using multiple independent hash functions to generate multiple file IDs for the file using the filename (rather than the implementation described hereinabove in which a single consistent hash function is used). In this embodiment, a node that is seeding a file into the Chord network determines each of the possible file IDs of the file using the hash functions, and inserts multiple copies of the file into the Chord network using the file IDs. In this embodiment, a node that is searching for a file in the Chord network will determine all of the possible file IDs of the file (by hashing the filename using each of the hash functions) and can then search for the file using the determined file IDs, sequentially or in parallel.

With respect to storage of multiple versions of a file in the Chord network, it will be appreciated that multiple versions of a file may be stored in the Chord network in any other suitable manner.

As described herein, Chord enables nodes to share files. In order to enable nodes of the Chord network to share files, each node of the Chord network needs to be able to search for and ultimately determine the location of a desired file in order to be able to obtain the desired file.

In Chord, each node maintains a search table. For a Chord network with a M-bit key space, each node N will maintain a search table having M entries, where the entries of the search table are referred to as "fingers". In the search table for node N, the $i^{th}$ finger points to the first node on the circle that is at least $2^{i-1}$ away from N. In general, unless otherwise indicated, the term "$i^{th}$ finger" will be used to denote the node that is pointed to by the $i^{th}$ entry of the search table. For example, in Chord network 100, the $3^{rd}$ finger of node 0 is node 5.

The search tables of the nodes, collectively, provide an efficient global search algorithm by which the location(s) of an object within the Chord network may be determined.

In FIG. 1, the key space is 6 bits, and, thus, each node has 6 fingers in its search table. In FIG. 1, the search table on node 0 may be represented as indicated in Table 1, which follows:

TABLE 1

| Finger | $2^{i-1}$ | First node ≥ $2^{i-1}$ |
|---|---|---|
| 1 | 1 | 2 |
| 2 | 2 | 2 |
| 3 | 4 | 5 |
| 4 | 8 | 9 |
| 5 | 16 | 16 |
| 6 | 32 | 32 |

In Chord, the network is dynamic. As new nodes join the Chord network and existing nodes leave the Chord network, the search tables at the active nodes of the Chord network may be affected. As such, in Chord, each active node K will update its associated search table periodically. An active node K may update it search table in any suitable manner. For example, an active node K may update its search table by searching for node ($K+2^{i-1}$), because the result from performing this search would be the value for the $i^{th}$ finger of the search table. It will be appreciated that active nodes of a Chord network may update their search tables in any other suitable manner.

In Chord, in addition to the search table, each node also stores the identities of its successor and its predecessor in the ring. This information is used for ring maintenance, such as when new nodes join the network and existing nodes leave the network, as well as when nodes recover from failure. In some Chord networks, in order to guard against the situation in which there are multiple concurrent node failures, a node may store the identities of its N successors and its N predecessors in the ring.

In Chord, nodes of the Chord network can search for and obtain files from other nodes of the Chord network. The Chord network supports a search algorithm by which nodes may search for files available from other nodes in the Chord network. The operation of the Chord search algorithm may be illustrated through an example using Chord network 100 of FIG. 1. In this example, assume that node 2 wants to search for file 0 in Chord network 100 of FIG. 1. Node 2 will access its search table in order to select one of the other nodes to which to send a file request. Since, from the perspective of node 2, the file ID of the target file (namely, file 0) is greater than the value of the largest finger of node 2 (namely, node 34) due to wraparound, node 2 will send a file request to node 34 requesting that node 34 search for file 0. Node 34 receives the file request from node 2. Node 34, since it is not storing file 0, will access its search table in order to select one of the other nodes to which to forward the file request. In node 34, the search table includes six fingers, pointing to nodes 35, 37, 40, 43, 51, and 2. Since the object ID of file 0 is between the $5^{th}$ and $6^{th}$ fingers (node 51 and node 2, respectively), node 34 forwards the search request to the node identified by the $5^{th}$ finger (node 51). Node 51 receives the file request from node 34. Node 51, since it is not storing file 0, will access its search table in order to select one of the other nodes to which to send the file request. In node 51, the search table includes six fingers, pointing to nodes 53, 53, 56, 62, 3, and 19. Since the object ID of file 0 is between the $4^{th}$ and $5^{th}$ fingers (node 62 and node 3, respectively), node 51 forwards the search request to the node identified by the $4^{th}$ finger (node 62). Node 62 receives the file request from node 51. Node 62, since it is not storing file 0, will access its search table in order to select one of the other nodes to which to send the file request. In node 62, the search table includes six fingers, pointing to nodes 0, 0, 2, 6, 16, and 30. Since the object ID of file 0 is indicated in both the $1^{st}$ and $2^{nd}$ fingers (node 0), node 62 knows that node 0 is active and forwards the search request to node 0. The node 0, in response to receiving the search request, responds to node 2, either directly or through the intermediate nodes (i.e., node 62, node 51, node 34, and then node 0), that it has file 0. The node 2 can then obtain file 0 from node 0 directly. Thus, from this example, it is clear that, in Chord, all of the nodes in Chord network cooperating to support the Chord searching algorithm.

In Chord, the Chord network is dynamic, as nodes may join the Chord network and leave the Chord network at any time. When nodes join and leave the Chord network, files are transferred between nodes. For example, a joining node may assume responsibility for storing at least the file having the same file ID as the node ID of the joining node (and, potentially, other files as well), while a leaving node may transfer responsibility for storing one or more files to another node. The procedures associated with joining and leaving a Chord network are described in additional detail hereinbelow.

In the Chord join procedure, when a node wants to join a Chord network, the joining node determines its node ID. The joining node determines its node ID by hashing its name into a key value. For example, if the name of the node is node-xyx@company-abc.com, the node ID would be the output of SHA-1(node-xyx@company-abc.com) where, for simplicity, we are assuming that the hash function is SHA-1 (although any suitable hashing function may be used). In this example, let the node ID for this node, as determined from the hashing operation, be K.

In the Chord join procedure, the joining node K then contacts an active node of the Chord network (denoted as an initialization node). At first glance, this initialization node may appear to be a centralized server, however, this is not the case as: (a) the initialization node can be any node that is currently active in the Chord network (e.g., if node K1 and node K2 want to join the Chord network at the same time, they could, and would likely, use different active nodes as their respective initialization nodes to join the network) and (b) the initialization node does not need to provide any special capability in addition to the basic capabilities (i.e., it can behaves just like any other node in the Chord network). The node K can obtain a list of potential candidate initialization nodes in any suitable manner (e.g., from one or more previous search tables, successor lists and/or processor lists on joining node K, from information administratively configured within joining node K, from a website, and the like). In this example, let the node ID of the initialization node be L.

In the Chord join procedure, joining node K then sends a request that initialization node L search for joining node K (i.e., search for an object with ID=K). At this point, two events may occur:

(A) Node L replies to joining node K with a value of N. Node N will be the node, among all active nodes, having a node ID that is just larger than K associated with joining node K. Thus, if joining node K is to join the Chord network, node N should be the successor node for joining node K. Node K then contacts node N and asks node N for the identity of the predecessor node of node N. In this example, let the predecessor of node N be denoted as node N−. The node N provides the value of N− to joining node K. Based on this information, node K then knows that it should insert itself into the Chord network between node N and node N−.

(B) Node L replies to joining node K with a value of K. This means that there is another node having a node ID of K that is already active within the Chord network. While this case is extremely unlikely in most Chord networks (e.g., in Chord network 100, which is a 160 bit key space, the odds of this situation occurring are 1 in $1.45*10^{48}$), it is possible. This situation can be addressed by having joining node K changing its own name slightly (e.g., adding a timestamp, adding a number, and the like) and using the new node name to generate a different node ID (denoted as K'). The joining node K' can start the process again by sending a new search request to initialization node L (i.e., a request that initialization node L search for joining node K').

In the Chord join procedure, following a determination of the insertion point for the joining node K, processing is performed for inserting the joining node within the Chord network. The joining node K is being inserted between node K− (the candidate predecessor of K) and node K+ (the candidate successor of K), where at this time, before node K joins the network, node K+ is the successor of node K−. The joining node K contacts successor node K+ indicating that it would like to join the Chord network. The successor node K+ then (1) informs joining node K that its predecessor is node K−, (2) begins transferring to joining node K any files for which node K should have responsibility (namely, files having file IDs of (K−)+1 through K, and (3) informs its predecessor node K− that joining node K is in the process of joining the Chord network. After the file transfer is complete, joining node K establishes a connection with predecessor node K−. After the connection between joining node K and predecessor node K− is established, joining node K informs successor node K+ that is has successfully joined the Chord network. The successor node K+ then breaks the connection with predecessor node K−, and both successor node K+ and predecessor node K− update their predecessor and successor lists.

In the Chord leave procedure, processing is performed for enabling the leaving node K to leave the Chord network in a controlled manner. The node K that is leaving has a predecessor node (denoted as node K−) and a successor node (denoted as node K+) associated therewith. The leaving node K contacts both the predecessor node K− and the successor node K+, informing both that it intends to leave the Chord network, and providing both nodes with the identity of the other. The leaving node K then transfers to successor node K+ all of the files that leaving node K is currently storing on behalf of the Chord network (i.e., all files having file IDs between (K−)+1 and K, including K).

After the transfer of files is complete, joining node leaves the Chord network by disconnecting from predecessor node K− and successor node K+. Nodes K− and K+ then establish a connection therebetween (which may be initiated by either of them). Nodes K− and K+ also update their predecessor and successor lists.

In addition to use of the Chord join procedure and the Chord leave procedure for enabling dynamic changes to the Chord network, Chord also supports a Chord recovery procedure for enabling recovery from node failures (i.e., the Chord leave and Chord join procedures are not used for recovering from node failures). The nodes of a Chord network periodically send heartbeat messages to their predecessor and successor nodes, respectively, thereby enabling the nodes of the Chord network to detect node failures quickly. In general, the heartbeat message from a node will include the identities of the predecessor and successor nodes of the node from which the heartbeat message originates. In this manner, when a node receives a heartbeat message from its successor node it knows the identity of the successor node of its successor node and, thus, when the successor of a node fails, the node can initiate a connection to the successor node of its successor node and the Chord ring is maintained. As noted above, in some Chord networks, nodes maintain lists of k predecessors and k successors. In this case, the Chord network can recover from failures of k−1 successive nodes. In this case, even for a small value of k, the odd of the failure of k successive nodes is very small. In some such Chord networks, the value for k may be determined as $2*\log_2(V)$, where V is average number of active nodes in the network (i.e., a Chord network that usually has 100,000 active nodes, k would be ~34).

The above-described Chord recovery procedure enables the Chord network to be repaired in the event of node failures, however, files that are stored at the failed nodes are lost. This problem may be addressed in a number of ways, at least two of which are described above. Additionally, in another embodiment, this problem is addressed by enabling nodes that obtain files to voluntarily become seed nodes for the files. A description of one such embodiment follows. A file is originally introduced into the Chord network by a member of the Chord network (where the member node is referred to as a seed node of the file). The seed node obtains the hashed value of the filename (i.e., the file ID), and searches for the node having the same node ID as the file ID. The seed node will locate the first active node in the Chord network that has a node ID that is equal to or greater than the file ID. The seed node sends the file to the located node. Then other nodes of the Chord network which obtain the file at a later time may voluntarily become seed nodes for the file. A seed node for a file will periodically search for that file in the Chord network and, if the seed node fails to locate the file, it will send the file to the appropriate node as described above. In this manner, "lost" files are recovered in the Chord network.

As described herein, in addition to storing and sharing files, a Chord network also may support services. While existing Chord networks only support file sharing services, Chord networks may eventually support one or more other services in addition to file sharing services. A service may be available from all nodes or a subset of nodes, and may only be available from a small subset of nodes. A service may be mandatory for all or some of the nodes, or may be supported by nodes on a voluntary basis. The node(s) supporting a service may transition between being active and inactive. It will be appreciated that each of these features associated with supporting services in Chord networks may vary based on one or more of the type of service being supported, the implementation of the Chord network, like factors. In view of the possibility of support of services in Chord networks, the service location capability enables each of the nodes within the Chord network to search for and locate a node which provides a particular service.

The service location capability is advantageous, when used to locate a node supporting a particular service, at least for the following reasons: (1) it uses the existing search tables maintained on the nodes of the Chord network (i.e., no new search table is required on the nodes); (2) the search is distributed (e.g., when searching for a service, the initiating node that initiates the service search will initiate at most M messages where M is the length of the key space of the Chord network and, thus, will receive at most M response messages so that the initiating node will not be flooded by an overwhelming number of responses); and (3) the service search can be executed in an orderly fashion, in stages, where each stage may be configured to have a high probability of success such that the number of messages exchanged in the Chord network is minimized. The service location capability also has the benefit that it enables efficient broadcast (which is useful in many applications).

The services which may be located in a Chord network include any services suitable for being supported by a Chord network.

A first service which may be supported by nodes of a Chord network is a "cross-ring searching" service in which a node may search for a file across multiple linked Chord networks. In general, a Chord network represents a community of interest where files of interest to the community are stored and shared. A node may belong to multiple Chord networks. This is clear from an understanding that individual users associated with nodes which may join Chord networks are likely to have different interests, such that it is likely that at least some nodes will belong to multiple sets of Chord networks. When a node searches for a file in a Chord network, the searching node may fail to locate the file within the Chord network for any number of reasons, such as: (a) the file has never been stored in the network (e.g., where the file is newly created and none of the nodes of the Chord network have yet acquired the file); (b) the file may not be of interest to the community and, thus, is not stored in that Chord network; (c) due to the fact that each node in the Chord network has a practical limit on the number of files that it may store on behalf of the Chord network (e.g., in rare instances the gap between a node and its predecessor is too large and, thus, the node cannot store all of the files; e.g., the policy of the Chord network typically specifies that older and/or less popular files may not be stored and, thus, will be unavailable within the Chord network); and (d) failures of nodes may cause some files to be unavailable within the Chord network; and (5) any other reasons which may cause files to be unavailable in the Chord network. If a node of a Chord network that is searching for a file belongs to multiple Chord networks, the node may search for the file in each of the Chord networks to which it belongs. If a node of a Chord network is unable to locate the file in the Chord network(s) to which the node belongs, the node may then wish to search for the file in one or more other Chord networks. In this case, the node may want to locate other nodes in the Chord network that are connected to one or more other Chord networks (i.e., other than the Chord network(s) that have already been searched). This expansion of the search for the file to one or more additional Chord networks is performed using a cross-ring search service by which nodes of the Chord network that belong to other Chord networks are located for use in searching for the file across multiple Chord networks.

A second service which may be supported by nodes of a Chord network is a "translation" service. The translation service may be for translating documents between languages. For example, a node of the Chord network may want a document translated from English to German, and some of the nodes in the Chord network may have this capability. Similarly, a node of the Chord network may want a document translated from Italian to French and some of the nodes in the Chord network may have this capability. For this type of service, a node may attempt to locate not just nodes supporting translation services, but, more specifically, nodes supporting the specific translation services required by the searching node (namely, translation from one language to another language).

The exemplary services described above demonstrate that there are many different services, in addition to file sharing, that may be supported by Chord networks. Thus, although specific examples of services which may be provided in Chord networks are described herein for purposes of clarity in describing the service location capability, it will be appreciated that the service location capability is not limited to use with any particular service.

The service location capability provides an algorithm by which a node on a Chord network may locate one or more other nodes on the Chord network that support or provide a particular service.

As described herein, existing Chord networks enable nodes on Chord networks to search for other nodes on the Chord network or to search for files stored in the Chord network. The service location capability depicted and described herein enables a Chord network to support a new type of search within the Chord network, namely, a service location search by which a node on the Chord network is able to search for the location of a particular service on the Chord network (i.e., to search for one or more other nodes on the Chord network that support a particular service as specific in a service search request).

In order to simply the description of the service location capability, the term "search" will be used in the following paragraphs to refer to a service-location search unless specifically indicated or described otherwise; however, since the service location capability utilizes existing search tables on the nodes of the Chord network, the term "search tables" used in the following paragraphs still refers to the Chord "finger" tables maintained at the nodes of the Chord network.

The service location capability is described using an example, and is then presented in more general terms using method diagrams showing the processing performed at different nodes of the Chord network that participate in providing the service location capability within the Chord network.

As depicted in FIG. 1 and described hereinabove, Chord network 100 has a 6 bit key space (i.e., supporting 64 addresses), and 36 of the 64 nodes are active (namely, nodes 0, 2, 3, 5, 6, 7, 9, 12, 13, 16, 17, 18, 19, 20, 21, 22, 23, 24, 26, 29, 30, 32, 34, 35, 37, 41, 43, 45, 49, 51, 53, 54, 56, 57, 58, 62). As further depicted in FIG. 1, a subset of the active nodes (namely, nodes 7, 19, 30, and 51) support a service, which is denoted as service A (illustratively, each of the active nodes that support service A is indicated using darker shading than is used with active nodes that do not support service A).

As an example, with reference to FIG. 1, assume that node 0 would like to locate one of the nodes of Chord network 100 that supports service A. In order to simplify the description of the example, we assume that the node which initializes the search is node 0 (it will be appreciated that there is no loss of generality, because the same argument may be made if the node which initializes the search is node N, as the same process may be performed by merely subtracting the value of N from the node IDs of all of the nodes in the Chord network). As indicated above in Table 1 (which is repeated below), the search table at node 0 has six entries including the following information:

TABLE 1

| Finger | $2^{i-1}$ | First node ≥ $2^{i-1}$ |
|---|---|---|
| 1 | 1 | 2 |
| 2 | 2 | 2 |
| 3 | 4 | 5 |
| 4 | 8 | 9 |
| 5 | 16 | 16 |
| 6 | 32 | 32 |

In this example, node 0 initiates a search for locating service A within Chord network 100. Based on this search table maintained at node 0, node 0 initiates the search locating service A by sending M search request messages to the M nodes identified by the M fingers of the search table, respectively. The search request message to the $i^{th}$ finger includes the following information: (1) an indication of the service to be located; and (2) a search range, i.e., a range of nodes for which the $i^{th}$ finger should search.

The indication of the service to be located may be specified using any suitable criteria for specifying a service (e.g., such as a service identifier, one or more parameters which may be used to describe the service, and the like, as well as various combinations thereof).

The search range identifying the range of nodes for which the $i^{th}$ finger should search may be specified in any suitable manner. For purposes of clarity in describing the search range, let the notation [m,n) be used to denote the range from m to n, including m but excluding n.

In one embodiment, for the $i^{th}$ finger, the search range would be [$i^{th}$ finger, i+1$^{th}$ finger). In our example, node 0 will send search messages to node 2, node 5, node 9, node 16, and node 32, and the search messages will include search ranges of [2,5), [5,9), [9,16), [16,32), and [32,0), respectively.

In another embodiment, for the $i^{th}$ finger, the search range can be further reduced from [$i^{th}$ finger, i+1$^{th}$ finger) to [$i^{th}$ finger, $2^i$). In our example, for the $3^{rd}$ finger of node 5, the search range would be [5, 8) instead of [5, 9), because the (i+1)$^{th}$ finger is the first node greater than or equal to $2^i$ (i.e., there are no active nodes between $2^i$ and the i+1$^{th}$ finger). While this embodiment provides a reduced range, the reduced range will not account for the rare instance where a new node in the range of [$2^i$, 1+1$^{th}$ finger] may have joined the network before node 0 has updated its search table. This potential problem may be seen by considering the $3^{rd}$ finger of node 0, which represents the event in which node 8 joins Chord network 100 before node 0 updates its search table.

From the descriptions of these search range embodiments, it is clear that both embodiments work in practice, however, the embodiment based on the [$i^{th}$ finger, i+1$^{th}$ finger) search range is more robust than the embodiment based on the [$i^{th}$ finger, $2^i$) search range.

As described above, node 0 initiates a search for locating service A within Chord network 100 by sending service search request messages to nodes 2, 5, 9, 16, and 32, respectively. The service search request messages received by nodes 2, 5, 9, 16, and 32, respectively, are processed for purposes of continuing the service location search.

Upon receiving the service search request message from node 0, each of the nodes 2, 5, 9, 16, and 32 first determines whether the requested service is supported locally. If any of the nodes 2, 5, 9, 16, and 32 receiving the service search request message from node 0 determines that the service is supported locally, that node responds to node 0 with a service search response message indicating that it supports the service. For each of the nodes 2, 5, 9, 16, and 32 receiving the service search request message from node 0 that determines that the service is not supported locally, that node initiates processing to determine whether or not to initiate one or more search messages to one or more other nodes for locating the service requested by node 0. A node receiving a service search request message (where the service is not supported locally) will initiate a service search request message to a finger or fingers (if any) in its local search table that fall within the search range specified in the received service search request message.

In this example, since none of the nodes 2, 5, 9, 16, and 32 receiving a service search request message from node 0 supports service A, each of nodes 2, 5, 9, 16, and 32 determines whether or not to initiate one or more search messages to one or more other nodes for locating service A requested by node 0.

The processing performed at a node receiving a service search request message from node 0 may be better understood by considering the processing performed by one of the nodes receiving the service search request message from node 0 (namely, one of nodes 2, 5, 9, 16, and 32).

In this example, consider the processing performed at node 16 upon receiving the service search request message from node 0. Node 16 receives a search request from node 0 with a range of [16,32). As indicated above, node 16 first determines whether or not it supports the requested service. In this example, node 16 does not support service A. Node 16 then determines whether or not to initiate a service search request message(s) to another node(s) of Chord network 100. Node 16 determines whether or not to initiate a service search request message(s) to another node(s) of Chord network 100 using search range [16,32) included in the service search request message received from node 0 and using its local search table. The search table of node 16 is indicated in Table 2, which follows:

TABLE 2

| Finger | $2^{i-1}$ | $16 + 2^{i-1}$ | First node $\geq 2 + 2^{i-}$ |
|---|---|---|---|
| 1 | 1 | 17 | 17 |
| 2 | 2 | 18 | 18 |
| 3 | 4 | 20 | 20 |
| 4 | 8 | 24 | 24 |
| 5 | 16 | 32 | 32 |
| 6 | 32 | 48 | 48 |

In this example, based on the search range of [16,32) included in the service search request message received from node 0 and the search table specified above, node 16 will generate service search request messages to nodes 17, 18, 20 and 24. The service search request messages initiated by node 16, like those initiated by node 0, include (1) an indication of the service to be located; and (2) a search range, i.e., a range of nodes for which the $i^{th}$ finger should search. In this example, the service search request messages initiated to nodes 17, 18, 20 and 24 each specify service A and, further, include search ranges [17,18), [18,20), [20,24), and [24,32), respectively. Node 16 does not initiate service search request messages to node 32 (the $5^{th}$ finger) and node 48 (the $6^{th}$ finger), because those nodes are outside of the search range specified in the service search request message received from node 0.

Figure 2:
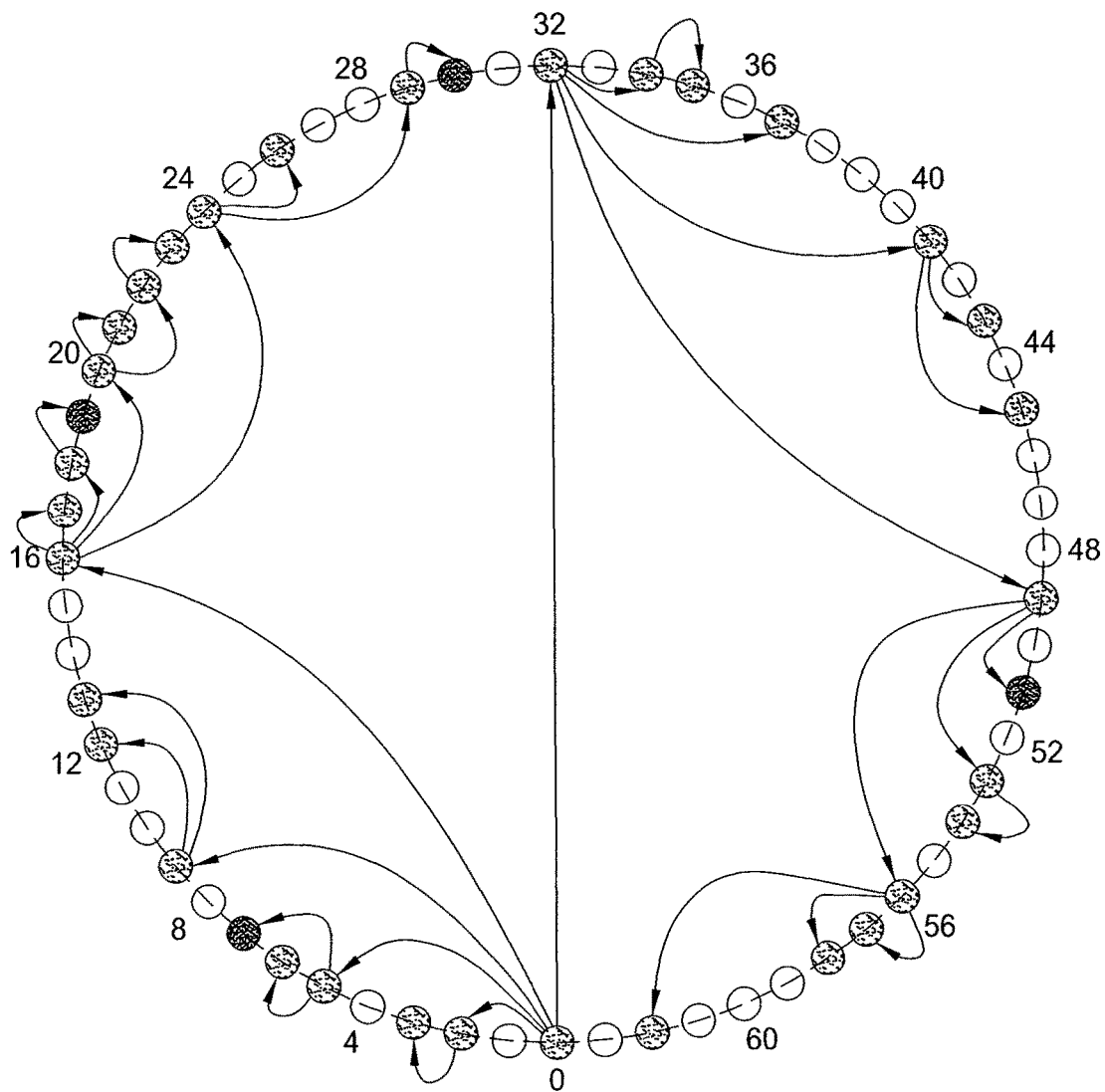
FIG. 2 depicts service search request messages initiated within the exemplary Chord network of FIG. 1 in response to a service location search initiated by one of the nodes of the exemplary Chord network of FIG. 1.

FIG. 2 depicts service search request messages initiated within exemplary Chord network 100 of FIG. 1 in response to a service location search initiated by node 0 of exemplary Chord network 100 of FIG. 1.

As depicted in FIG. 2, service search request messages are send within Chord network 100 as follows: node 0 sends messages to nodes 2, 5, 9, 16, and 32; node 2 sends a message to node 3; node 5 sends messages to nodes 6 and 7; node 9 sends messages to nodes 12 and 13; node 16 sends messages to nodes 17, 18, 20, and 24; node 18 sends a message to node 19; node 20 sends messages to nodes 21 and 22; node 22 sends a message to node 23; node 24 sends messages to nodes 26 and 29; node 29 sends a message to node 30; node 32 sends messages to nodes 34, 37, 41 and 49; node 32 sends a message to node 33, node 40 sends messages to nodes 42 and 45; node 49 sends messages to nodes 51, 53, and 56; node 53 sends a message to node 54; node 56 sends messages to nodes 57, 58, and 62.

In this manner, the service location request for service A that is initiated by node 0 is propagated throughout Chord network 100 such that each node of Chord network 100 may respond with an indication as to whether or not it supports the requested service (and, thus, node 0 may learn the identities of any nodes supporting service A).

As described hereinabove, each service search request message initiated within the Chord network for purposes of locating a service results in initiation of a corresponding service search response message. The service search response messages propagate back toward the node that originates the service location search. In this manner, the node that originates the service location search is informed of the node(s) of the Chord network that support the requested service.

With respect to propagation of service search response messages, propagation of positive response messages and negative response messages is handled differently.

At a given downstream node that receives a service search request message from an upstream node, a positive response message is propagated from the given downstream toward the upstream node immediately. For example, this may be in response to a determination by the given downstream node that it supports the requested service locally, or in response to the given downstream node receiving a positive response message from a node further downstream of the downstream node (i.e., a downstream node to which the given downstream node initiates a service search request message).

At a given downstream node that receives a service search request message from an upstream node, a negative response message is propagated from the given downstream toward the upstream node only after waiting for response messages from each downstream node(s) to which the given downstream node initiates a service search request message(s). In this manner, the given downstream node can consolidate responses from its downstream node(s) into a single response message that is sent to the upstream node.

The propagation of service search response messages may be better understood by considering the exemplary Chord network 100 of FIG. 1 and FIG. 2.

In this example, when node 19 receives the service search request message from node 18, node 19 immediately responds to node 18 indicating that it supports service A, node 18 will immediately relay this response to node 16 which, in turn, will immediately relay the response back to node 0.

In this example, when node 9 receives a service search request message from node 0, node 9 sends two service search request messages to nodes 12 and 13, respectively, because node 9 does not itself support service A. Here, assuming that node 9 receives a negative response from node 12 before receiving a negative response from node 13, node 9 will store the negative response from node 12 while awaiting a response from node 13. Them upon receiving the negative response from node 13, node 9 will consolidate the two negative responses from nodes 12 and 13 into a single negative response and will send the single negative response to node 0.

In the service location capability depicted and described herein, references to messages (and, more specifically, response messages), in general, are references to application level messages. The need for this distinction will be understood by considering that, when a node N sends a message to a node J, node J usually will reply with an acknowledgement to node N to indicate to node N that it has received the message. If node N does not receive the acknowledgement after some time, node N will resend the message (e.g., up to a certain number of tries). In the service location capability depicted and described herein, this acknowledgement process is assumed to be a background process and is ignored herein for purposes of simplifying the description of the service location capability. In other words, the service search response messages referenced herein are not the acknowledgements of this background process which may or may not be running within the Chord network.

Figure 3:
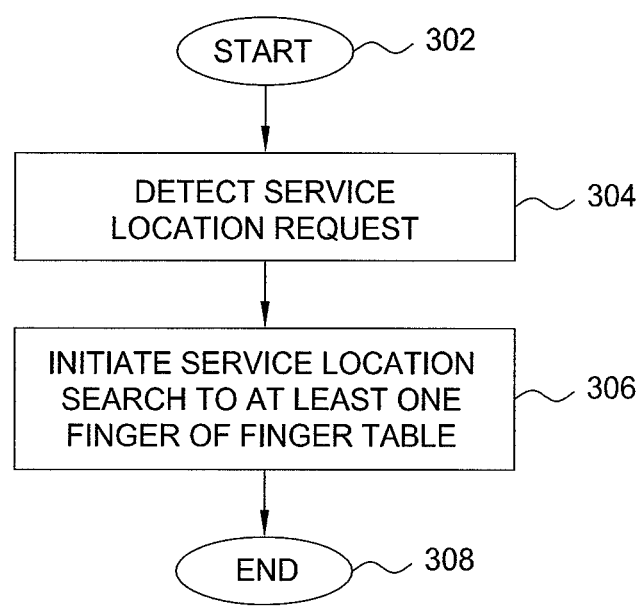
FIG. 3 depicts one embodiment of a method for generating a service search request message at a node initiating a service location request.
Figure 4:
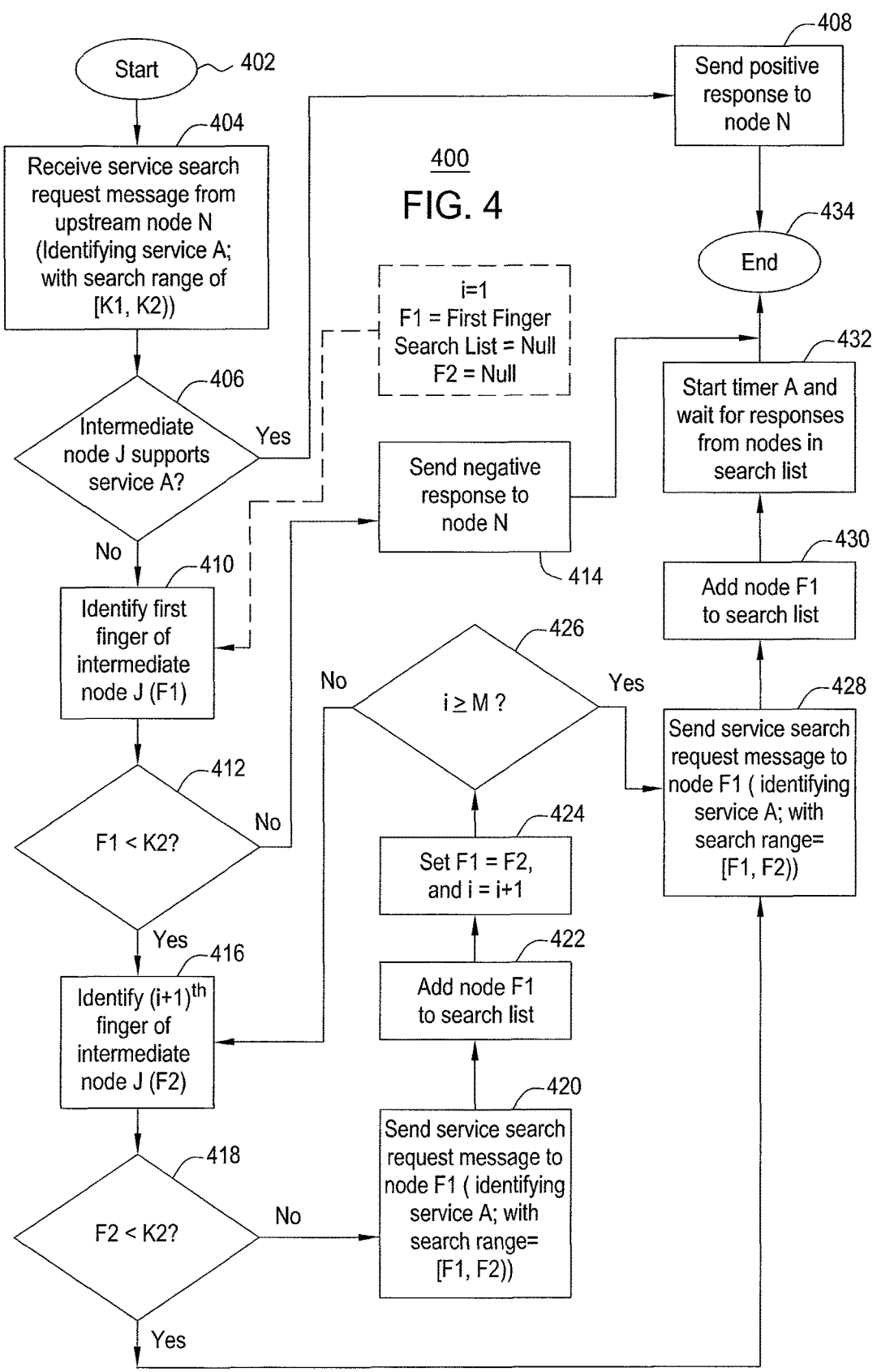
FIG. 4 depicts one embodiment of a method for processing a service search request message at an intermediate node.
Figure 5:
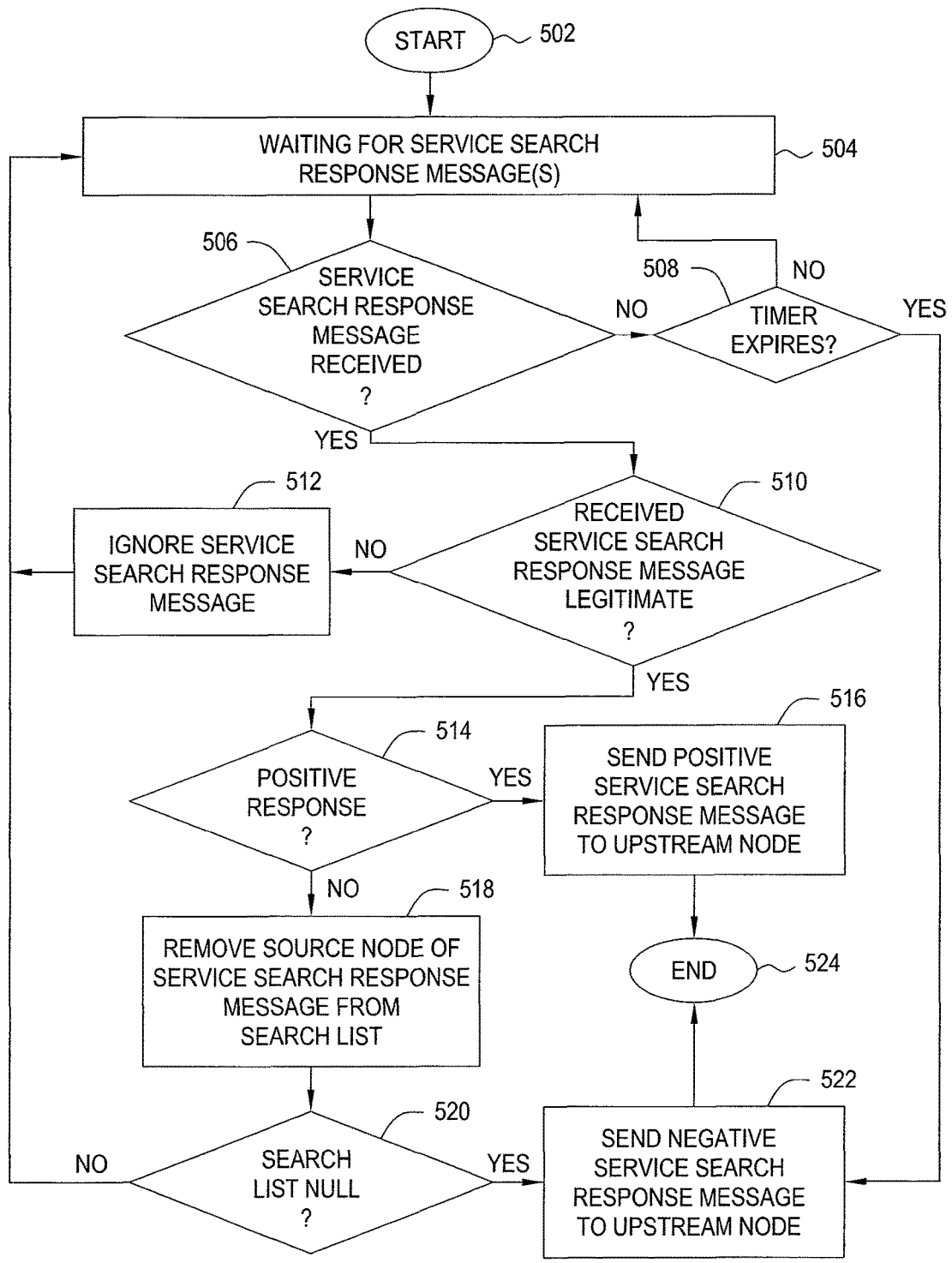
FIG. 5 depicts one embodiment of a method for processing service search response messages at an intermediate node.

In order to provide a better understanding of embodiments of the service location capability, the processing performed by the originating node and the intermediate nodes in providing the service location capability is depicted and described with respect to FIGS. 3-5.

FIG. 3 depicts one embodiment of a method for generating a service search request message at an originating node.

At step 302, method 300 begins.

At step 304, the originating node detects a service location request.

The service location request is a request to search for a service within the P2P network, for identifying a location(s) of the service within the P2P network (e.g., identifying one or more nodes of the P2P network that support the service).

The service location request identifies a service needed or desired at the originating node. The service location request may be detected in any suitable manner, which may depend on the manner in which the service location request is initiated at the originating node. The service location request may be initiated manually (e.g., by a user of the originating node) or automatically (e.g., by the originating node in response to detecting a trigger condition).

At step 306, the originating node initiates a service location search for the service. The service location search is a process for searching for a service within the P2P network in order to identify a location(s) of the service within the P2P network.

The service location search may be initiated using the search table maintained on the originating node. The service location search may be initiated by initiating a service search request to one or more nodes of the search table maintained on the originating node. The originating node may initiate the service search request by propagating one or more service search request messages toward one or more of the nodes of the search table.

A service search request message generated and propagated by the originating node includes information that is adapted for use in enabling the originating node to locate at least one node of the P2P network that supports the requested service.

The service search request message includes a node ID of the originating node, for use by nodes receiving the service search request message to respond to the service search request message.

The service search request message includes a message ID of the service search request message, for use by the originating node and the node receiving the service search request message for matching request messages and response messages of the same service location search.

The service search request message includes service identification information adapted for use in identifying the requested service. For example, the service identification information may include one or more of a service ID that identifies the service, service description information (e.g., one or more parameters, attributes, and/or criteria that is adapted for use in identifying the service and/or describes the service), and the like.

The service search request message includes a search range specified by the originating node for use by the node to which the service search request message is initiated. The search range is denoted as [K1, K2], where K2 is the largest value of the search range and K1 is the smallest value of the search range. The search range of the service search request message may depend on the type of service location search initiated by the originating node (e.g., a full network search, a staged network search, a progressive network search, and the like).

It will be appreciated that the information included within the service search request message may be different (e.g., less information may be included, more information may be included, different information may be included, and the like).

The manner in which the originating node initiates the service location search (i.e., the number of service search request messages initiated by the originating node, and the timing of those service search request messages) depends on the type of service location search being performed (e.g., a full network search, a staged network search, a progressive network search, and the like).

In one embodiment, in which a full network search is initiated by the originating node, service search request messages are propagated from the originating node toward each of the fingers in the finger table in parallel.

In one embodiment, in which a staged network search is initiated by the originating node, service search request messages are propagated from the originating node toward one or more fingers in the finger table in series. The use of a staged network search may be better understood by way of reference to FIG. 6 and FIG. 7 in conjunction with other figures depicted and described herein.

In one embodiment, in which a progressive network search is initiated by the originating node, service search request messages are propagated from the originating node toward a subset of fingers in the finger table in parallel as an initial search and, optionally, toward one or more subsequent fingers in the finger table in series as one or more subsequent searches. The use of a progressive network search may be better understood by way of reference to FIG. 8 and FIG. 9 in conjunction with other figures depicted and described herein.

At step 308, method 300 ends.

Although depicted and described as ending, following initiation of the service location search by the originating node, the originating node may then continue to perform processing in support of the service location search by initiating processing for handling one or more service search response messages received by the originating node in response to the one or more service search request messages initiated the originating node.

Although primarily depicted and described herein as being performed serially, at least a portion of the steps of method 300 may be performed contemporaneously, or in a different order than depicted and described with respect to FIG. 3. Although primarily depicted and described herein with respect to a specific implementation of process logic for performing service search request message generation at an intermediate node, it will be appreciated that process logic for performing service search request message generation at an intermediate node may be implemented in various other ways while still supporting the service location capability depicted and described herein.

FIG. 4 depicts one embodiment of a method for processing a service search request message at an intermediate node.

At step 402, method 400 begins.

At step 404, the intermediate node (denoted as node J) receives a service search request message from an upstream node (denoted as node N), which may be the initiator of the service location search or an upstream intermediate node.

The service search request message includes any information suitable for searching for the requested service.

The service search request message includes a node ID of the originator of the service search request message (i.e., upstream node N).

The service search request message includes a message ID of the service search request message.

The service search request message includes service identification information adapted for use in identifying the requested service. For example, the service identification information may include one or more of a service ID that identifies the service, service description information (e.g., one or more parameters, attributes, and/or criteria that describes the service and/or is adapted for use in identifying the service), and the like.

The service search request message includes a search range specified by the upstream node N for the intermediate node J. The search range is denoted as [K1,K2), where K2 is the largest value of the search range and K1 is the smallest value of the search range.

It will be appreciated that different information may be included within the service search request message.

At step 406, a determination is made as to whether the intermediate node J supports the requested service. This determination may be performed in any suitable manner (e.g., by comparing at least a portion of the service identification information to information available at intermediate node J).

If intermediate node J supports the requested service, method 400 proceeds to step 408 (at which point the intermediate node J initiates a positive service search response message to upstream node N).

If intermediate node J does not support the requested service, method 400 proceeds to step 410 (at which point the intermediate node J initiates additional processing for determining whether to extend the service location search to other nodes of the network within the search range of the service search request message).

At step 408, the intermediate node J sends a positive service search response message to upstream node N. The service search response message may include any information suitable for use in informing the originating node that the requested service is supported by intermediate node J and enabling the originating node to request the service from intermediate node J. For example, the service search response message may include an identifier of the intermediate node J, an indication that the message is a response to a service search request message from upstream node N (e.g., a message ID of the service search request message), an indication that intermediate node J supports the requested service, network contact information for intermediate node J (e.g., IP address, port number, and the like) for use by the originating node in requesting the service from intermediate node J, and the like. It will be appreciated that the service search response message may include different information. From step 408, method 400 proceeds to step 434, where method 400 ends.

At step 410, the intermediate node J identifies the first finger of its search table.

As depicted in FIG. 4, in conjunction with step 410 or at any other suitable time, intermediate node J also may perform initialization functions for use in performing additional processing for determining whether to extend the service location search to other nodes of the network. For example, the intermediate node j may initialize a finger counter (i) equal to one, set a first finger variable (F1) equal to the first finger of intermediate node j (i.e., F1=first finger), set a second finger variable (F2) equal to NULL, set a search list equal to NULL (where the search list is a list of nodes to which intermediate node J has sent a service search request message on behalf of the service search request message received from upstream node N, which may be used to manage responses to any service search request messages initiated by intermediate node J), and the like. It will be appreciated that fewer, more, and/or different variables, lists, and/or like parameters may be utilized and/or initialized in any other suitable manner.

At step 412, a determination is made as to whether the largest value of the search range (K2) is greater than the first finger (F1) of the intermediate node J. The intermediate node J is checking whether its first finger is out of the search range. If K2 is not greater than F1, method 400 proceeds to step 414. If K2 is greater than F1, method 400 proceeds to step 416.

At step 414, the intermediate node J sends a negative service search response message to upstream node N. In this case, no service search request message is generated by intermediate node J. The service search response message may include any information suitable for use in informing upstream node N that there is no node in the range of [F1, F2) that is supporting service A. From step 412, method 400 proceeds to step 434, where method 400 ends.

At step 416, the intermediate node J identifies the $(i+1)^{th}$ finger of its search table. In the first pass through method 400, this is the second finger of the search table of intermediate node J.

At step 418, a determination is made as to whether the largest value of the search range (K2) is greater than the $(i+1)^{th}$ finger (F2) of the intermediate node J. The intermediate node J is checking whether its $(i+1)^{th}$ finger is out of the search range.

If K2 is greater than F2, method 400 proceeds to step 428 (i.e., the search range of the message is reduced to [F1,K2) and the resulting service search request message that is generated by intermediate node J is the last to be generated by intermediate node J in response to the service search request message received from upstream node N).

If K2 is not greater than F2, method 400 proceeds to step 420 (i.e., the resulting service search request message that is generated by intermediate node J is the last service search request message that is generated by intermediate node J in response to the service search request message received from upstream node N).

At step 420, intermediate node J sends a service search request message to node F1 having a search range of [F1, F2). At this point, both F1 and F2 are less than K2 and, thus, the search range [F1, F2) is within the search range [K1, K2). The service search request message includes information typically included within a service search request message, as described herein.

At step 422, intermediate node J adds node F1 to the search list, for use by intermediate node J to manage responses to any service search request messages initiated by intermediate node J.

At step 424, intermediate node J updates the first finger variable (F1) to be equal to the second finger variable (F2) and increments the finger counter (i=i+1).

At step 426, a determination is made as to whether finger counter i is greater than or equal to M (where $2^M$ is the size of the key space and M is the size of the finger table on intermediate node J).

If the finger counter i is not greater than or equal to M, method 400 returns to step 416.

If the finger counter i is greater than or equal to M, method 400 proceeds to step 428 (i.e., F1 is the last finger, and the resulting service search request message that is generated by intermediate node J is the last to be generated by intermediate node J in response to the service search request message received from upstream node N).

At step 428, intermediate node J sends a service search request message to node F1 having a search range of [F1, K2). The service search request message includes information typically included within a service search request message, as described herein.

At step 430, intermediate node J adds node F1 to the search list, for use by intermediate node J to manage responses to any service search request messages initiated by intermediate node J.

At step 432, intermediate node J starts a time and waits for one or more service search response messages that will received by intermediate node J in response to the one or more service search request messages initiated by intermediate node J.

At step 434, method 400 ends.

Although depicted and described as ending, where execution of method 400 results in initiation of one or more service search request messages by intermediate node J, intermediate node J may continue to perform processing in support of the service location request initiated by the originating node by initiating processing for handling one or more service search response messages received by intermediate node J in response to the one or more service search request messages initiated by intermediate node J (e.g., by executing method 500 depicted and described with respect to FIG. 5).

Although primarily depicted and described herein as being performed serially, at least a portion of the steps of method 400 may be performed contemporaneously, or in a different order than depicted and described with respect to FIG. 3. Although primarily depicted and described herein with respect to a specific implementation of process logic for performing service search request message generation at an intermediate node, it will be appreciated that process logic for performing service search request message generation at an intermediate node may be implemented in various other ways while still supporting the service location capability depicted and described herein.

FIG. 5 depicts one embodiment of a method for processing service search response messages at an intermediate node (denoted as node J). The intermediate node J performs the method for processing service search response messages for purposes of providing a service search response message to an upstream node from which intermediate node J received a service search request message which triggered intermediate node J to send one or more additional service search request messages to one or more downstream nodes.

At step 502, method 500 begins.

At step 504, intermediate node J waits for one or more service search response messages. The service search response message(s) are expected by the intermediate node J in response to the one or more service search request messages initiated by intermediate node J (e.g., by executing method 400 depicted and described with respect to FIG. 4).

At step 506, intermediate node J determines whether a service search response message is received from a downstream node.

If a service search response message is received from a downstream node, method 500 proceeds to step 510 (at which point processing of the service search response message begins).

If a service search response message is not received from a downstream node, method 500 proceeds to step 508.

At step 508, a determination is made as to whether a timer has expired. The timer may be set by intermediate node J in any suitable manner (e.g., as an initialization step in the execution of method 500, as part of the execution of method 400, or in any other suitable manner). The timer may be set to any suitable length of time.

If the timer has not expired, method 500 returns to step 504 and proceeds from step 504 to step 506 (i.e., to the waiting state during which the intermediate node J is waiting for one or more service search response messages from one or more downstream nodes).

If the timer has expired, method 500 proceeds to step 522 (at which point intermediate node J initiates a negative service search response message to the upstream node, because intermediate node J has not received all outstanding service search response messages from downstream nodes within the length of time allotted).

With respect to steps 504, 506, and 508, it will be appreciated that this function may be implemented in other ways. For example, rather than explicit steps of determining whether a service search response message is received (step 506) and determining whether a timer expires (step 508) being performed within method 500, much less being performed within method 500 in a particular sequence, method 500 may just remain in the waiting state (i.e., step 504) until detecting that a service search response message is received (at which point method 500 proceeds to step 510) or until detecting that the timer has expired (at which point method 500 proceeds to step 522). For example, rather than monitoring the timer as an explicit step within the method 500, monitoring of the timer may be performed as a background process such that, regardless of the point in method 500 at which processing is being performed, detection by the intermediate node J that the time has expired may cause method 500 to proceed to step 522 (e.g., directly or gracefully). It will be appreciated that this function may be implemented in other ways.

At step 510, a determination is made as to whether the received service search response message is legitimate. The legitimacy of the received service search response message may be determined in any suitable manner. In one embodiment, for example, the legitimacy of the received service search response message is determined by checking a request ID included within the received service search response message to verify that the service search response message is being provided in response to a service search request message from intermediate node J.

If the service search response message is not legitimate, method 500 proceeds to step 512.

If the service search response message is legitimate, method 500 proceeds to step 514.

At step 512, intermediate node J ignores the received service search response message. From step 512, method 500 returns to step 504 (i.e., intermediate node J continues to wait for one or more service search response messages).

At step 514, a determination is made as to whether the received service search response message is positive (i.e., a node supporting the requested service has been located) or negative (i.e., a node supporting the requested service has not been located).

If the service search response message is positive, method 500 proceeds to step 516.

If the service search response message is negative, method 500 proceeds to step 518.

At step 516, intermediate node J sends a positive service search response message to the upstream node.

The service search response message may include any information suitable for use in providing, to the upstream node, an indication of the node which has been identified as supporting the requested service. For example, the service search response message may include an identifier of the intermediate node J, an indication that the message is a response to a service search request message from the upstream node (e.g., a message ID of the service search request message), an indication of the node that supports the requested service, network contact information for the node that supports the requested service (e.g., IP address, port number, and the like) for use by the originating node in requesting the service from the node that supports the requested service, and the like. It will be appreciated that the service search response message may include different information. From step 516, method 500 proceeds to step 524, where method 500 ends.

At step 518, intermediate node J removes the source node from a search list. The source node is the source of the service search response message received by intermediate node J. The search list is a list of one or more nodes from which intermediate node J is expecting a service search response message, which, as described with respect to method 400, is used by intermediate node J to manage responses to any service search request messages initiated by intermediate node J).

At step 520, a determination is made as to whether the search list is NULL. This is a determination as to whether all of the service search response messages expected to be received by intermediate node J have in fact been received (such that an associated service search response message may be sent from intermediate node J to the upstream node). If the search list is NULL (i.e., all expected service search response messages have been received), method 500 proceeds to step 522.

If the search list is not NULL (i.e., all expected service search response messages have not been received), method 500 returns to step 504 and proceeds from step 504 to step 506 (i.e., to the waiting state during which the intermediate node J is still waiting for one or more service search response messages from one or more downstream nodes).

At step 522, intermediate node J sends a negative service search response message to the upstream node.

The service search response message may include any information suitable for use in providing, to the upstream node, an indication that intermediate node J does not support the requested service and that none of the downstream nodes contacted by intermediate node J on behalf of the upstream node support the requested service. From step 522, method 500 proceeds to step 524, where method 500 ends.

At step 524, method 500 ends.

Although primarily depicted and described herein as being performed serially, at least a portion of the steps of method 500 may be performed contemporaneously, or in a different order than depicted and described with respect to FIG. 5. Although primarily depicted and described herein with respect to a specific implementation of process logic for performing service search response message processing at an intermediate node, it will be appreciated that process logic for performing service search response message processing at an intermediate node may be implemented in various other ways while still supporting the service location capability depicted and described herein.

As indicated herein, FIG. 5 is primarily directed toward service search response message processing performed at an intermediate node. FIG. 5, however, also may be adapted to specify service search response message processing performed at an originating node, i.e., at the node that initiates the service location request for the service. For an originating node, method 500 is adapted by removing steps 516 and 522. With respect to step 516 and step 522, these steps are unnecessary for an originating node since the originating node is the source of the service location request (i.e., there is no need for the originating node to send a response). With respect to removal of step 516, from step 514, method 500 may proceed to step 524 (e.g., once the originating node has identified one of the nodes supporting the requested service, the originating node does not care if there are any other nodes that support the requested service) or may continue to monitor for additional service search response messages if any are still outstanding (e.g., where the originating node may want a list of all nodes of the network that support the requested service). With respect to removal of step 522, from step 508 (where the timer has expired) and step 520 (where the search list is NULL), method 500 proceeds to step 524.

In a service location search as described above: (1) if the key space of the Chord network is M bits, the source of the service location search will send out at most M service search request messages and will receive at most M service search response messages, and the intermediate nodes will send out even less request messages and receive even less response messages, such that none of the nodes of the Chord network are overloaded with messages, and (2) a service search request message sent from an upstream node to a downstream node may cause one or more additional service search request messages to be generated at the downstream node, such that the service location search for a service may generate a sequence of searches which may be distributed over one or more steps or stages, up to at most M−1 steps or stages. From this, it may be seen that, in a service location search as described above, if there are K active nodes in the Chord network at the time of the service location request, the service location request will generate K−1 messages in the Chord network as the service location search process eventually delivers one service search request message to each node of the Chord network (excluding the source of the service location request). These messages are distributed over all the nodes of the so that none of the nodes are overloaded by the messages; however, in general, K is a large number and, thus, it would be desirable to reduce the number of messages generated in the Chord network for purposes of locating a service.

In one embodiment, the number of messages generated in the Chord network for purpose of locating a service may be reduced by performing a progressive search in which searches for the service are initiated in portions of the circle serially in stages, rather than initiating searches for the service to all portions of the circle in parallel. This type of service location search is referred to herein as a progressive service location search.

The progressive service location search may be better understood by first considering that one method to reduce the number of messages generated in the Chord network for purpose of locating a service is to search only a portion of the circle, instead of the full circle, in the initial search. In this case, since the full circle is not searched, this search may not locate a node that provides the requested service. In this case, the probability that the search of a portion of the circle is successful may be balanced against the number of messages initiated in order to locate the service (i.e., against the size of the search range within the circle). In this case, the size of the search range may be determined as follows.

The manner in which the size of the search range may be determined for guaranteeing a small search failure rate may be better understood by considering an example. In this example, let the key space be $2^M$, and assume that, on the average, there are usually $2^K$ active nodes in the network that provide the service. Based on these assumptions, the probability there is an active node providing the service for a particular node-ID is $\alpha=2^K/2^M=2^{-(M-K)}$. In this example, further assume that that node 0 is searching for service A within an initial search range of [1, L). The probability that no node within the range [1, L) would provide service A is $(1-\alpha)^{L-1}$. In this example, let the desired search failure rate be, for example, less than 2% (although any desired search failure rate may be used), which results in the equation $(1-\alpha)^{L-1}<1/50$. Using this equation, and taking the logarithm (base e) of both sides of the equation, produces: $(L-1)*\ln(1-\alpha)<-\ln(50)$, where $\ln(1-\alpha)=-\alpha-\alpha^2/2-\alpha^3/3-\alpha^4/4$ and so on. In general, $\alpha$ is a very small number and, thus, the higher order terms are insignificant and can be ignored. Thus, the above equation can be approximated as follows: $-(L-1)*\alpha<-\ln(50)$, or $L>(3.91)*1/\alpha+1$, or, more simply, as $L>(3.91)*1/\alpha$ (ignoring the 1). The manner in which the size of the search range may be determined for guaranteeing a small search failure rate also may be better understood by considering a more illustrative example. In this example, consider a Chord network having a key space of 160 bits. Assume that, on average, there are 100,000 active nodes in the network, of which there are usually $2^{10}$ (or 1024) nodes, among the actives nodes, that are providing service A (i.e., ~1% of the active nodes). In this case $\alpha=2^{-150}$, and L is selected to be greater than $(3.91)*2^{150}$. Let $L=4*2^{150}=2^{152}$. With this selection of L, the initial search will cover $2^{152}/2^{160}=1/2^8=1/256$ part of the circle. Thus, in this example, the initial search will have a 98% chance of success, while the number of messages exchanged in the network for purposes of locating the service is reduced by a factor of 256 (i.e., on average the number of nodes in the initial service range is approximately 400 and, thus, the initial search generates only about 400 search messages, rather than the 100,000 search messages that would otherwise be generated if the initial search spanned the entire Chord network).

As described above, there is likely to be only a slight chance that the initial search will fail to locate a node that supports the service. In the event that the initial search does fail to locate a node that supports the service, the source of the service location search can then initiate a second search to a second portion of the circle (e.g., in the example above, node 0 would initiate a second service location search with range [L, 2L). If the second search fails to locate a node that supports the service, the source of the service location search can then initiate a third search to a third portion of the circle (e.g., in the example above, node 0 would initiate a third service location search with range [2L, 3L). Thus, the source node may continue to search each of the plurality of portions of the circle of the Chord network until either a node that supports the service is located or the entire circle has been searched without locating a node that supports the service, thereby providing a progressive service location search that can significantly reduce the number of messages exchanged within the Chord network in order to locate a node that supports the service.

In the progressive service location search embodiment described above, the endpoints of the search arcs (and, thus, the search ranges) are L, 2L, 3L, 4L, and so forth. This is depicted in FIG. 6.

Figure 6:
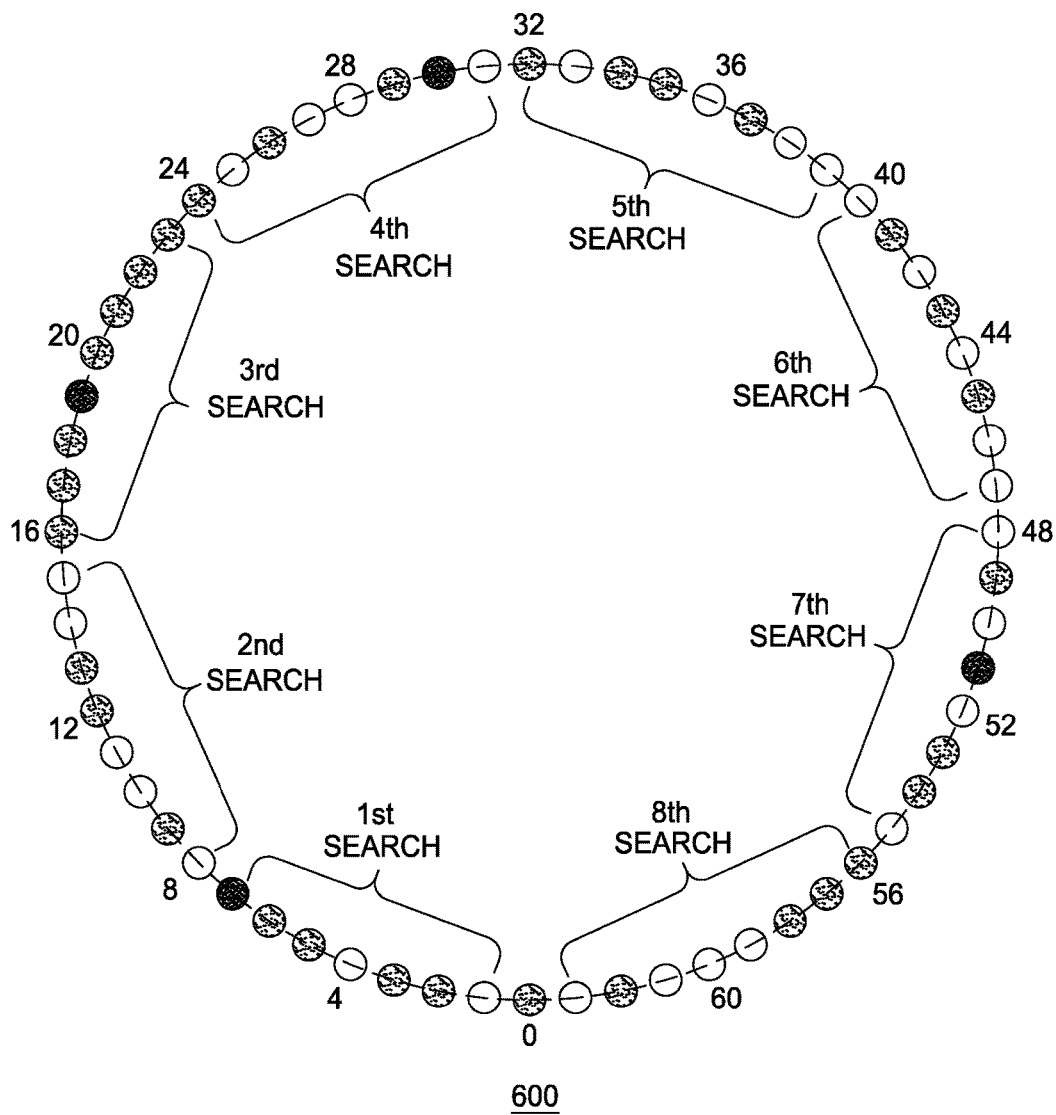
FIG. 6 depicts an exemplary Chord network, illustrating an example of performing a progressive service location search for a service in the exemplary Chord network.

FIG. 6 depicts an exemplary Chord network, illustrating an example of performing a progressive service location search for a service in the exemplary Chord network. In Chord network 600, the key space is 6 bits (i.e., 64 IDs), and the size of the search range for each stage of the progressive service location search is 8 nodes.

In the progressive service location search embodiment described above, the endpoints of the search arcs are L, 2L, 3L, 4L, and so forth, which may not be compatible with the search table maintained at the source node which initiates the service location request (i.e., they are not the fingers of the search table maintained at the source node). As a result, when executing a search over one of the arcs (e.g., over [n*L, (n+1)*L)), multiple service location search messages may need to be generated. This is depicted in FIG. 7.

Figure 7:
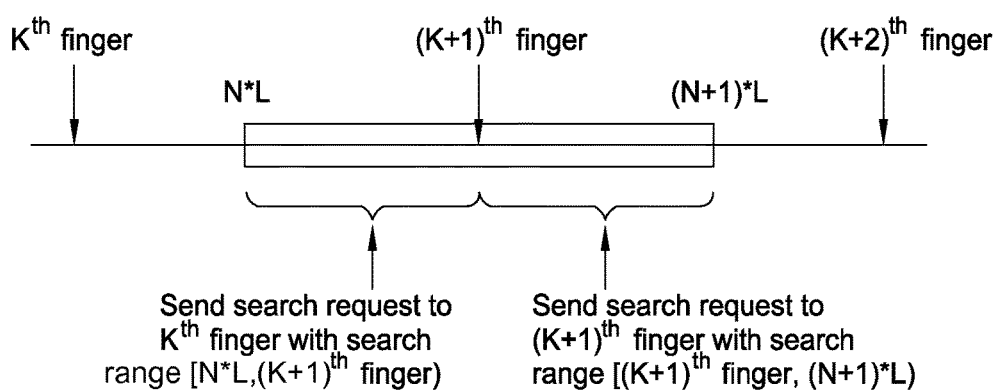
FIG. 7 depicts an exemplary search range for performing a progressive service location search for a service in the exemplary Chord network of FIG. 6.

FIG. 7 depicts an exemplary search range for performing a progressive service location search for a service in the exemplary Chord network of FIG. 6. As depicted in FIG. 7, the $(k+1)^{th}$ finger falls within the search range (i.e., n*L< $(k+1)^{th}$ finger<(N+1)*L), and both the $k^{th}$ finger and the $(k+2)^{th}$ finger fall outside the search range. In this case, in order to execute a service location search over the arc, the source node would generate two service search request messages as follows: (a) one search request is sent the $k^{th}$ finger with a search range of (n*L, $(k+1)^{th}$ finger), and (b) one search request is sent to the $(k+1)^{th}$ finger with a search range of [$(k+1)^{th}$ finger, (N+1)*L).

In one embodiment, the progressive service location search may be modified such that the progressive service location search is in alignment with the search table of the source node, thereby preventing the situation in which a search over an arc requires multiple service search request messages.

Figure 8:
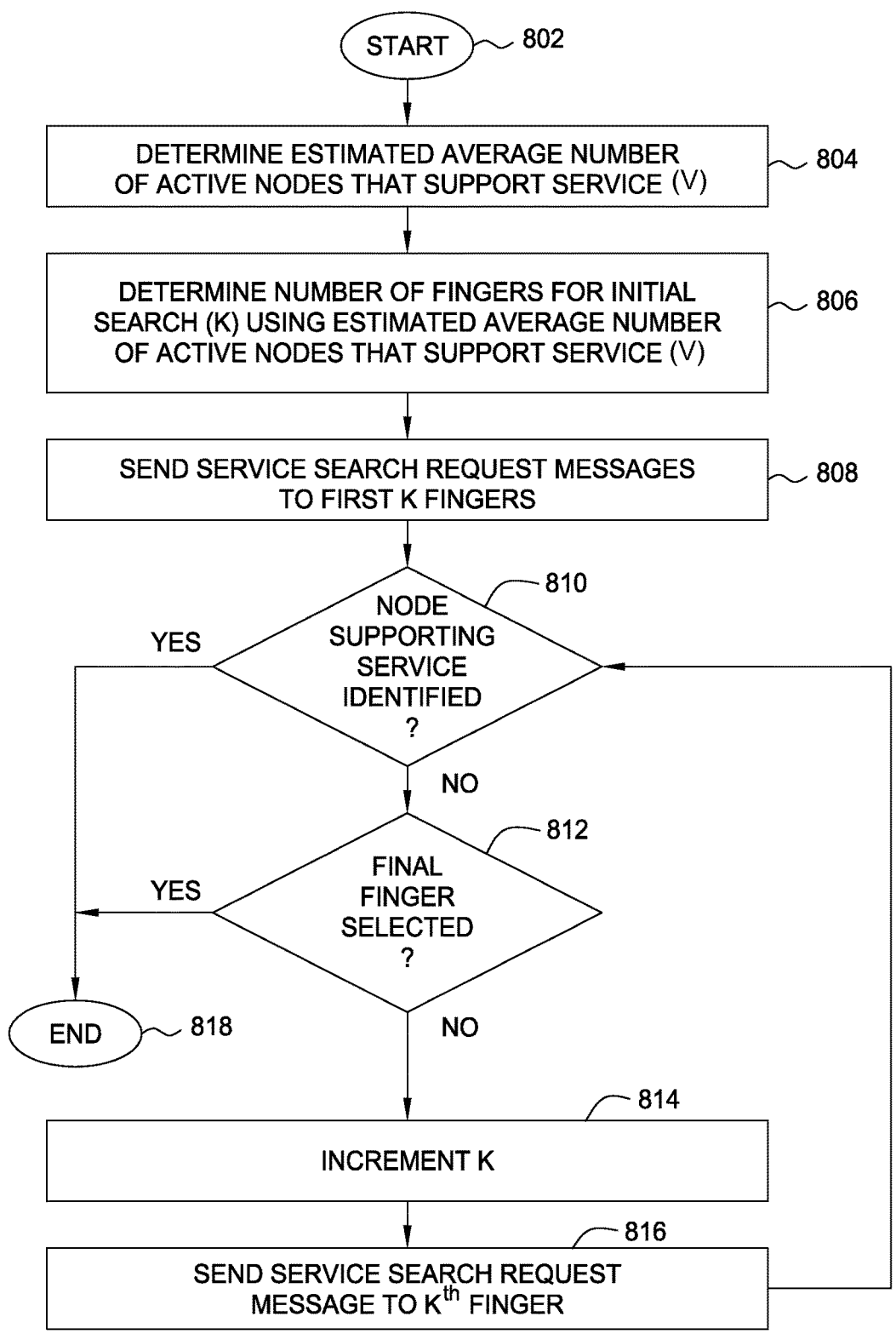
FIG. 8 depicts one embodiment of a method for generating service search request messages at a node initiating a service location request using an aligned progressive search location search.

An exemplary embodiment of an aligned progressive service location search is depicted and described with respect to FIG. 8 and FIG. 9.

FIG. 8 depicts one embodiment of a method for generating service search request messages at a node initiating a service location request using an aligned progressive search location search.

At step 802, method 800 begins.

At step 804, the node determines an estimated average number of active nodes that support the service (denoted as V).

The estimated average number of active nodes that support the service may be determined from any suitable source of such information (e.g., from local memory of the node, from a web server, and the like).

The average number of active nodes that support a service may be estimated in any suitable manner. In one embodiment, the average number of active nodes that support a service may be estimated using a modified version of the service location search algorithm depicted and described with respect to FIG. 1-FIG. 6. In the service location search algorithm described with respect to FIG. 1-FIG. 6, an intermediate node forwards a positive response message to an upstream node as soon as it is received from a downstream node. In one embodiment, the service location search algorithm depicted and described with respect to FIG. 1-FIG. 6 may be modified such that each intermediate node, rather than immediately forwarding a positive response to the upstream node upon receiving the first positive response from one of the downstream nodes to which it initiated service search request messages, will wait for all response messages from all downstream nodes to which it initiated service search request messages and will then forward a consolidated response (which would include the total number of the downstream nodes that support the service, and the node ID and IP address of at least one of these nodes) to the upstream node. The intermediate nodes may be instructed to perform this modified processing in any suitable manner. In one embodiment, for example, a new indicator may be added to the service search request messages in order to inform the intermediate nodes as to whether or not to perform processing for estimating average number of active nodes that support a service. In one such embodiment, the new indicator may be set to TRUE for at least the first few searches for a particular service, such that the source node receives at least a few estimates of the number of active nodes that support a service such that the node can determine therefrom an estimate of the average number of active nodes that support a service. The new indicator may then be set to FALSE so that the intermediate nodes are not required to perform the modified processing for every request for the service. In one further embodiment, the estimate of the average number of active nodes that support the service may be updated periodically by periodically performing a service location search for the service using the service location search algorithm described with respect to FIG. 1-FIG. 6 with the new indicator set to TRUE. After having determined an estimate of the average number of active nodes that support a service, the node may then use the estimate of the average number of active nodes that support the service to perform subsequent searches for the service using the progressive service location search capabilities. Furthermore, in addition to the above-described embodiments, many variations of the above-described embodiments may be employed. For example, search messages from the originating node to part of the network can have the indicator set to TRUE, while the indicator is set to FALSE for the remaining portion. In this example, responses from the search messages with the indicator set to TRUE can be used to estimate the average number of active nodes that support the service, but with less accuracy; however, searches messages with the indicator set to FALSE will produce a faster response as there is no wait for positive responses. It will be appreciated that many other methods also are possible. In general, the differences between the different methods include trade-offs between accuracy of the estimation, the complexity of the algorithm, response time, the number of messages generated, and the like.

At step 806, the node determines a number of fingers for an initial search for the service (denoted as K). The number of fingers for the initial search is determined using the average number of active nodes that support the service. The number of fingers for the initial search is determined by solving for L from the equation $(L-1)*\ln(1-a)<\ln(1/b)$, where (i) a is the probability that a node ID will have an active node that supports the service, (ii) b is the probability that the search is negative, and (iii) L is the search range.

At step 808, the node sends service search request messages to the first K fingers of the search table maintained at the node. A service search request message includes any information suitable for use in searching for the requested service, such as an ID of the service search request message, service identification information adapted for use in identifying the requested service, a search range, and the like. The search range for the $i^{th}$ finger is [$i^{th}$ finger, $+I$)$^{th}$ finger), where i=1, . . . , K. It will be appreciated that different information may be included within the service search request message.

At step 810, a determination is made as to whether a node supporting the service has been identified (i.e., based on the initial service search request messages from step 808 and, optionally, one or more subsequent service search request messages from step 816). If a node supporting the service has been identified, method 800 proceeds to step 818, at which point method 800 ends. If a node supporting the service has not been identified, method 800 proceeds to step 812.

At step 812, a determination is made as to whether the final finger in the search table has been selected (i.e., whether K=M). If the final finger in the search table has been selected, method 800 proceeds to step 818, at which point method 800 ends. If the final finger in the search table has not been selected, method 800 proceeds to step 814.

At step 814, the value of K is incremented. At step 816, the node sends a service search request message to the $K^{th}$ finger of the search table maintained at the node. From step 816, method 800 returns to step 810, at which point a determination is made as to whether a node supporting the service has been identified during the current stage of the progressive search.

At step 816, which is entered when a node supporting the service is identified or no node supporting the service has been identified after all fingers of the search table have been processed, method 800 ends.

With respect to FIG. 8, in one embodiment, if the $(i+1)^{th}$ finger is the same as the $i^{th}$ finger, a service search request message is not sent for the $(i+1)^{th}$ finger (so as to avoid sending duplicate messages to the fingers in the initial search), thereby preventing multiple service search request messages from being sent to the same node.

Although primarily depicted and described herein as being performed serially, at least a portion of the steps of method 800 may be performed contemporaneously, or in a different order than depicted and described with respect to FIG. 8. Although primarily depicted and described herein with respect to a specific implementation of process logic for performing service search request message generation at an intermediate node, it will be appreciated that process logic for performing service search request message generation at an intermediate node may be implemented in various other ways while still supporting the service location capability depicted and described herein.

FIGS. 9A-9D depict service search request messages initiated within the exemplary Chord network of FIG. 1 in response to a service location search initiated by one of the nodes of the exemplary Chord network of FIG. 1, illustrating an example of performing an aligned progressive search location search for a service in the exemplary Chord network of FIG. 1.

Figure 9A:
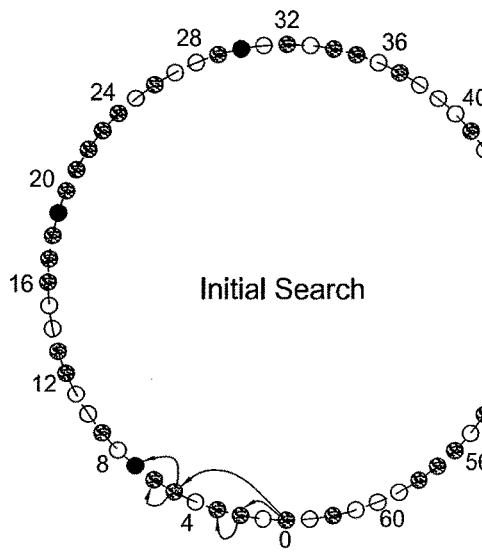
FIGS. 9A-9D depict service search request messages initiated within the exemplary Chord network of FIG. 1 in response to a service location search initiated by one of the nodes of the exemplary Chord network of FIG. 1, illustrating an example of performing an aligned progressive search location search for a service in the exemplary Chord network of FIG. 1.

In the example of FIGS. 9A-9D, node 0 is initiating a service location request. The estimated average number of active nodes that support the requested service is equal to eight ($L=2^3=8$), which indicates that the initial search for the service will include the first three fingers of the search table of node 0, namely, nodes 2, 2, and 5. Thus, service search request messages are sent to nodes 2 and 5, with search ranges of [2,5) and [5, 9), respectively (node 9 being the $4^{th}$ finger). This initial search by node 0 is illustrated in FIG. 9A, with the service search request messages being sent to nodes 2 and 5, and with node 2 sending a service search request message to 3, and node 5 sending service search request messages to nodes 6 and 7. In this example, node 7 is an active node supporting the requested service and, thus, node 0 will have located a node that supports the requested service in the initial search, and the aligned progressive service location search would be complete.

Figure 9B:
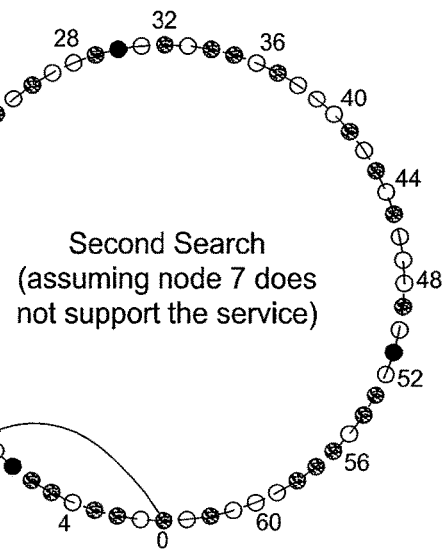

In the example of FIGS. 9A-9D, however, for illustratively purposes, assume that node 7 does not support the service and, thus, the initial search fails. Upon determining that the initial search has failed, node 0 then initiates a subsequent search for the service to the next finger in its search table, namely, node 9. Thus, a service search request message is sent to node 9, with a search range of [9,16). This subsequent search by node 0 is illustrated in FIG. 9B, with the service search request message being sent to node 9, and with node 9 sending service search request messages to nodes 12 and 13. In this example, there are no active nodes within the range [9,16) that support the requested service and, thus, the aligned progressive service location search would continue.

Figure 9C:
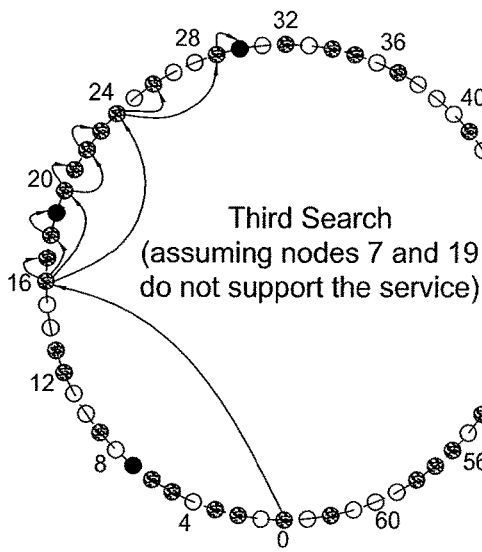

In the example of FIGS. 9A-9D, upon determining that the first subsequent search has failed, node 0 then initiates a second subsequent search for the service to the next finger in its search table, namely, node 16. Thus, a service search request message is sent to node 16, with a search range of [16,32). This subsequent search by node 0 is illustrated in FIG. 9C, with the service search request message being sent to nodes 16, and with node 16 sending service search request messages to nodes 17, 18, 20, and 24 (as well as with those nodes propagating additional service search request messages). In this example, node 19 is an active node supporting the requested service and, thus, node 0 will have located a node that supports the requested service in the initial search, and the aligned progressive service location search would be complete.

Figure 9D:
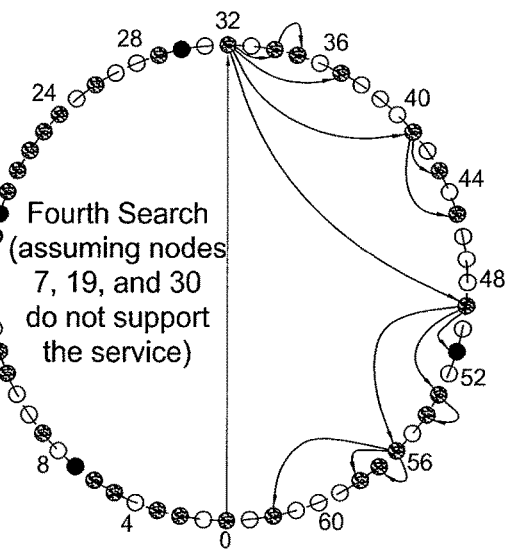

In the example of FIGS. 9A-9D, however, for illustratively purposes, assume that node 19 does not support the service and, thus, the second subsequent search fails. Upon determining that the second subsequent search has failed, node 0 then initiates a third subsequent search for the service to the next finger in its search table, namely, node 32. Thus, a service search request message is sent to node 32, with a search range of [32,0). This subsequent search by node 0 is illustrated in FIG. 9D, with the service search request message being sent to node 32, and with node 32 sending service search request messages to nodes 34, 37, 40, and 49 (as well as with those nodes propagating additional service search request messages). In this example, node 51 is an active node supporting the requested service and, thus, node 0 will have located a node that supports the requested service in the initial search, and the aligned progressive service location search would be complete.

In the aligned progressive service location search, multiple service search request messages are sent by the originating node in the initial stage, however, a single service search request message is sent by the originating node in each of the subsequent stages. This is evident from the exemplary method of FIG. 8 and the example of FIGS. 9A-9D. In general, the search ranges for the first two searches each cover L node IDs and, after that, the search range of the subsequent searches doubles in every stage (e.g., the $3^{rd}$ search covers approximately $2*L$ node IDs, the $4^{th}$ search covers approximately $4*L$ node-IDs, and so on).

As described herein, progressive service location search is one suitable means for reducing the number of messages exchanged within the Chord network for locating a node supporting a requested service.

In one embodiment, the number of messages exchanged within a Chord network for locating a node supporting a requested service may be reduced by caching, at nodes of the network, node IDs of one or more nodes previously identified as nodes that support the requested service. In this embodiment, from the perspective of a source node of the node, node IDs of one or more nodes previously identified by the source node as nodes that support the requested service may be cached as the source node. In this embodiment, when searching for the service, the search message may include an indicator which can be set to indicate that the source node is willing to accept cached information and, thus, when a node receives such a search request the node could then respond with node ID(s) from its cache. In this manner, the number of search messages is reduced and response time is faster; however, there is a risk that the cached information is stale. In one embodiment, in order to avoid stale information, only node IDs cached within the last X amount of time will be included in the response, where the X amount of time may be configured as needed or desired (e.g., last 30 minutes, last 4 hours, last day, and the like).

In one embodiment, the number of messages exchanged within a Chord network for locating a node supporting a requested service may be reduced by piggybacking on heartbeat messages exchanged between nodes of the Chord network to exchange information regarding which nodes support which services. As described herein, a node in the Chord network sends heartbeat messages to its predecessor and successor nodes periodically. The heartbeat messages sent by a node to its predecessor includes the node ID(s) of the successor (or K successors) of the node and, similarly, the heartbeat message sent by a node to its successor includes the node ID(s) of the predecessor (or K predecessors) of the node. In this embodiment, in addition to predecessor/successor information, the heartbeat message sent by a node will include information indicative of any services supported by that node, thereby enabling each of the nodes to know the service capabilities of its neighbors. In this manner, the number of messages that need to be exchanged in order to locate a service in the Chord network is reduced.

As described hereinabove, one service which may be supported by a Chord network is the cross-ring search service. The cross-ring search service enables a target node to initiate a request to search for an object on one or more other Chord networks of which the target node is not a member.

In general, members of a Chord network form a community that would like to share files pertaining to some common interest(s), such as music of a certain type, videos of a certain type, academic research topics, and the like. A user may have many interests and, thus, his or her node may join multiple Chord networks at the same time. If a node that is searching for a file fails to locate the file in the Chord network(s) to which it belongs, the node may wish to expand the search for the file to one or more additional Chord networks, which may be achieved using the cross-ring search service.

Using the cross-ring search service, an originating node that is searching for the file will search the Chord network(s) of which it is a member to locate any node(s) that belong to one or more other Chord networks. The originating node initiates a search request. In the search request, the originating node specifies that the service is a cross-ring search service. The search request may include additional service specific information.

The additional service specific information may include a no-search list, which is a list of Chord network IDs of Chord networks in which the originating node has already searched for the file. In this case, when responding to this request, these Chord networks should be ignored (i.e., a node receiving the search request will only send a positive response if that node is a member of a Chord network(s) other than the Chord network(s) indicated in the no-search list.

The additional service specific information may include a specific-search list, which is a list of Chord network IDs of Chord networks in which the originating node would like to search for the file. In this case, when responding to this request, all Chord networks other these Chord networks should be ignored (i.e., a node receiving the search request will only send a positive response if that node is a member of one of the Chord networks indicated in the specific-search list).

Using the cross-ring search service, an originating node that is searching for the file will receive search responses in response to the search request. In this case, any positive search response includes the Chord network ID(s) of the Chord network(s) that triggered the positive search response. Upon receiving a positive search response, the originating node may attempt to obtain the file from the identified Chord network(s) in any suitable manner.

In one embodiment, upon receiving a positive search response, the originating node may attempt to obtain the file from the identified Chord network(s) by joining the identified Chord network(s). In this case, upon joining the chord network(s), the originating node may then initiate a search for the file within the joined Chord network(s).

In one embodiment, upon receiving a positive search response, the originating node may request that the node that responded with the positive search response initiate a search for the file within the identified Chord network(s) on behalf of the originating node. This may be useful where the originating node is unable or unwilling to join the identified Chord network(s), such as where the originating node does not have authorization to join the identified Chord network(s), where the originating node does not have or does not want to devote the resource required to join and leave the identified Chord network(s) (i.e., when a node joins a Chord network, the implicit assumption is that the node will store a number of files on behalf of the Chord network, and joining and leaving a Chord network takes time and network resources as files are transferred between nodes), where the originating node is technologically unable to join the identified Chord network (e.g., where the originating node is an IPv4-only node and the identified Chord network(s) is an IPv6 Chord network or where the originating node is an IPv6 only node and the identified Chord network(s) is an IPv4 network), and the like. The originating node may request that the node that responded with the positive search response initiate a search for the file within the identified Chord network(s) on behalf of the originating node by sending a search request message to the node that responded with the positive search response. In this case, the search request message sent by the originating node includes the full name of the file for which the originating node is searching, because the identified Chord network(s) may have a different key space and/or use a different hash function than the Chord network of the originating node. If the file is not located within the identified Chord network(s), the originating node receives a negative search response. If the file is located within the identified Chord network(s), the node that is storing the file forwards the file to the originating node. The file may or may not be stored in the Chord network of the originating node.

Although primarily depicted and described herein with respect to embodiments in which the service location capability is implemented within a particular type of P2P network, namely, a Chord network, the P2P service location capability may be implemented within any other type of P2P networks suitable for supporting the service searching capability.

In one embodiment, the service location capability may be adapted such that the service location capability is suitable for use in DHT-based P2P networks in general. In one such embodiment, the P2P network for which the service location capability is provided has a well-structured geometry (e.g., for Chord, the geometry is a circle), and the concept of a "region" can be defined from this geometry (e.g., for Chord, the "region" is an arc of the circle). When a source node of the DHT-based P2P network is initiating a service location search, the source node sends a service search request to nodes in its routing table, and each service search request sent to a node includes a description of the region to which the search should be limited by the node receiving the service search request. When an intermediate receives a service search request, the intermediate nodes determines whether it is aware, locally, of a node supporting the requested service (e.g., it could identify itself, its predecessor, its successor, one or more nodes from cached information available on the intermediate node, and the like, as well as combinations thereof). If the intermediate node identifies, locally, a node supporting the requested service, the intermediate node responds with a positive response. If the intermediate node is unable to identify, locally, a node supporting the requested service, the intermediate node propagates the service search request based on its own routing table. The propagation of the service search request by the intermediate node has a scope that is limited by information included within the service search request received by the intermediate node and information from the routing table of the intermediate node. The search ranges of service search requests used to locate a service may be adapted such that overlap between search ranges is minimized, so as to improve the efficiency of the search; however, in certain cases at least some overlap may be desirable if the overlap simplifies search range description requirements. In such a generalized implementation of the service location capability, many of the other capabilities that are depicted and described herein with respect to Chord networks also may be utilized (e.g., to estimate the probability of a successful search when the search is limited to a region, to perform progressive searches, and the like, as well as combinations thereof).

Although depicted and described herein with respect to embodiments in which a service location capability is provided, it will be appreciated that the service location capability depicted and described herein may be adapted to provide an information distribution capability for distributing information within P2P networks. In such embodiments, the service search request messages that are described herein within the context of the service location search capability may be adapted for use as information distribution messages in the information distribution capability. In such embodiments, the information distribution capability may be implemented such that information may be distributed to all nodes of the P2P network, one or more ranges of nodes of the P2P network, to one or more nodes of the P2P network that satisfy one or more criteria, and the like, as well as various combinations thereof.

Figure 10:
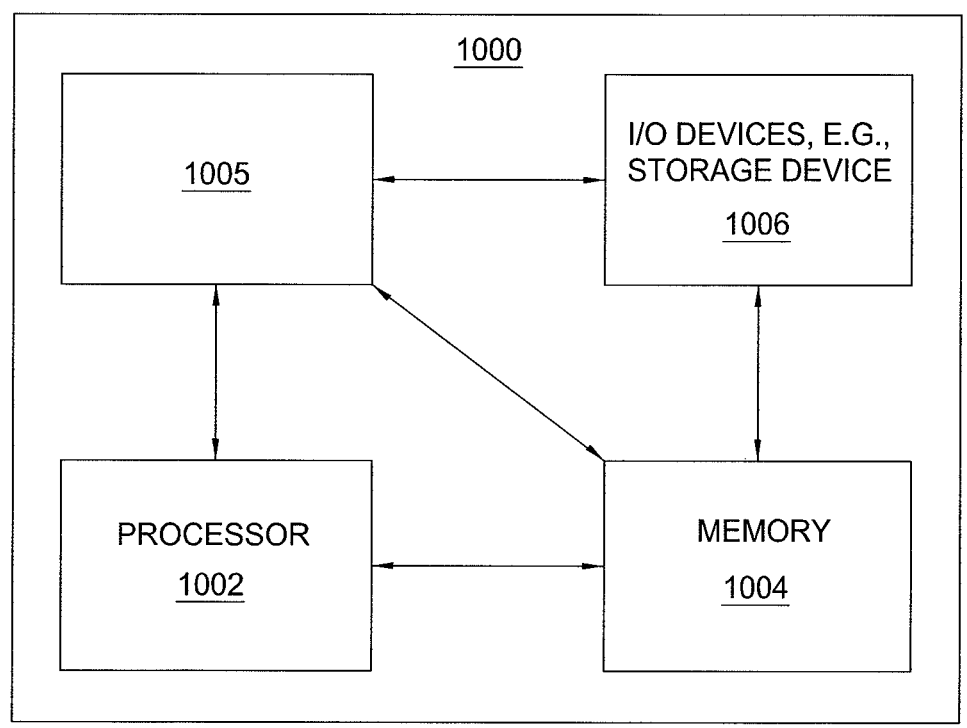
FIG. 10 depicts a high-level block diagram of a general-purpose computer suitable for use in performing the functions described herein.

FIG. 10 depicts a high-level block diagram of a computer suitable for use in performing the functions described herein. As depicted in FIG. 10, computer 1000 includes a processor element 1002 (e.g., a central processing unit (CPU) or other suitable processor(s)), a memory 1004 (e.g., random access memory (RAM), read only memory (ROM), and the like), a service location search module/process 1005, and various input/output devices 1006 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It should be noted that functions depicted and described herein may be implemented in software and/or in a combination of software and hardware, e.g., using a general purpose computer, one or more application specific integrated circuits (ASIC), and/or any other hardware equivalents. In one embodiment, a service location search process 1005 can be loaded into memory 1004 and executed by processor 1002 to implement the functions as discussed herein above. As such, service location search process 1005 (including associated data structures) can be stored on a computer readable storage medium or carrier, e.g., RAM memory, magnetic or optical drive or diskette, and the like.

It is contemplated that portions of the functions discussed herein that are implemented as software may be configured on the nodes of the peer-to-peer network in any suitable manner (e.g., provided during manufacturing of the nodes, administratively loaded at the node, downloaded from a web server or other suitable source, and the like, as well as various combinations thereof). It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for searching for a service within a peer-to-peer (P2P) network comprising a plurality of nodes, the method comprising:
   detecting, at a first node of the P2P network, a request to search for a service within the P2P network, wherein the first node comprises a collection of entries identifying a plurality of nodes of the P2P network;
   determining, based on an estimated average number of active nodes of the P2P network that support the service, a search range size for use by the first node in searching for the service within the P2P network;
   determining, based on the search range size, a first search range for use by the first node in searching for the service within the P2P network, wherein the first search range specifies a first range of node identifiers of the P2P network;
   identifying, from the collection of entries based on the first search range, an identified subset of nodes comprising a subset of the nodes of the P2P network identified in the collection of entries; and
   initiating a service search request from the first node toward a selected node of the identified subset of nodes, wherein the service search request is a request to identify at least one node of the P2P network that supports the service, wherein the service search request comprises information indicative of the service and a second search range for use by the selected node to search for the service within the P2P network, wherein the second search range specifies a second range of node identifiers of the P2P network.

2. The method of claim 1, wherein determining the search range size for use by the first node in searching for the service within the P2P network is further based on a probability related to success of a search for the service within the P2P network.

3. The method of claim 1, wherein determining the search range size for use by the first node in searching for the service within the P2P network is based on $(L-1)*\ln(1-a) < \ln(1/b)$, wherein:
   "a" is a probability that an active node supports the service;
   "b" is a probability that a search for the service is negative; and
   L is the search range size for use by the first node in searching for the service.

4. The method of claim 1, wherein identifying the identified subset of nodes from the collection of entries based on the first search range comprises:
   identifying, from the collection of entries, one or more of the entries falling within the first search range.

5. The method of claim 1, wherein the identified subset of nodes comprises multiple nodes from the collection of entries, the method further comprising:
   initiating multiple service search requests from the first node toward the respective multiple nodes from the collection of entries in parallel.

6. The method of claim 1, further comprising:
based on a determination that a positive search response is not received from at least one of the nodes of the identified subset of nodes:
  initiating, toward a next node associated with a next entry of the collection of entries that is not in the identified subset of nodes, a subsequent service search request for locating the service within the P2P network.

7. The method of claim 6, further comprising:
determining, based on the on the search range size for use by the first node in searching for the service within the P2P network, a search range for use by the next node toward which the service search request is initiated.

8. The method of claim 1, further comprising:
based on a determination that the first node receives a positive search response indicative that a node supporting the service has been located, initiating a request for the service from the first node toward the node supporting the service.

9. The method of claim 1, further comprising:
determining, based on the first search range, the second search range for use by the selected node to search for the service within the P2P network, wherein the second search range is bounded by a first endpoint node and a second endpoint node.

10. The method of claim 9, wherein the first search range is bounded by a first endpoint node and a second endpoint node, wherein the first endpoint of the second search range comprises a successor node of the selected node, wherein the second endpoint of the second search range comprises the second endpoint node of the first search range.

11. The method of claim 1, wherein the first search range is bounded by a first endpoint node and a second endpoint node, the method further comprising:
  identifying, from the collection of entries based on a second search range for use by the first node in searching for the service within the P2P network, a second identified subset of nodes comprising a second subset of the nodes of the P2P network identified in the collection of entries, wherein the second search range is bounded by a first endpoint node and a second endpoint node;
  initiating a second service search request from the first node toward a second selected node of the second identified subset of nodes, wherein the second service search request is a request to identify at least one node of the P2P network that supports the service, wherein the second service search request comprises information indicative of the service and a search range for use by the second selected node to search for the service within the P2P network, wherein the search range for use by the second selected node specifies a range of node identifiers of the P2P network, wherein the search range for use by the second selected node is bounded by a first endpoint node and a second endpoint node, wherein the first endpoint of the search range for use by the second selected node comprises a successor node of the second selected node and the second endpoint of the search range for use by the second selected node comprises the second endpoint node of the second search range; and
  initiating a subsequent service search request from the first node toward the selected node of the identified subset of nodes, wherein the subsequent service search request is a request to identify at least one node of the P2P network that supports the service, wherein the subsequent service search request comprises information indicative of the service and a subsequent search range for use by the selected node to search for the service within the P2P network, wherein the subsequent search range specifies a range of node identifiers of the P2P network, wherein the subsequent search range is bounded by a first endpoint node and a second endpoint node, wherein the first endpoint of the subsequent search range comprises the second endpoint node of the first search range and the second endpoint of the first subsequent search range comprises a predecessor node of the second selected node.

12. An apparatus for searching for a service within a peer-to-peer (P2P) network comprising a plurality of nodes, the apparatus comprising:
  a processor and a memory communicatively connected to the processor, the processor configured to:
    detect, at a first node of the P2P network, a request to search for a service within the P2P network, wherein the first node comprises a collection of entries identifying a plurality of nodes of the P2P network;
    determine, based on an estimated average number of active nodes of the P2P network that support the service, a search range size for use by the first node in searching for the service within the P2P network;
    determine, based on the search range size, a first search range for use by the first node in searching for the service within the P2P network, wherein the first search range specifies a first range of node identifiers of the P2P network;
    identify, from the collection of entries based on the first search range, an identified subset of nodes comprising a subset of the nodes of the P2P network identified in the collection of entries; and
    initiate a service search request from the first node toward a selected node of the identified subset of nodes, wherein the service search request is a request to identify at least one node of the P2P network that supports the service, wherein the service search request comprises information indicative of the service and a second search range for use by the selected node to search for the service within the P2P network, wherein the second search range specifies a second range of node identifiers of the P2P network.

13. The apparatus of claim 12, wherein the processor is configured to determine the search range size for use by the first node in searching for the service within the P2P network based on a probability related to success of a search for the service within the P2P network.

14. The apparatus of claim 12, wherein the processor is configured to determine the search range size for use by the first node in searching for the service within the P2P network is based on $(L-1)*\ln(1-a)<\ln(1/b)$, wherein:
  "a" is a probability that an active node supports the service;
  "b" is a probability that a search for the service is negative; and
  L is the search range size for use by the first node in searching for the service.

15. The apparatus of claim 12, wherein, to identify the identified subset of nodes from the collection of entries based on the first search range, the processor is configured to:
  identify, from the collection of entries, one or more of the entries falling within the first search range.

16. The apparatus of claim 12, wherein the identified subset of nodes comprises multiple nodes from the collection of entries, wherein the processor is configured to:
   initiate multiple service search requests from the first node toward the respective multiple nodes from the collection of entries in parallel.

17. The apparatus of claim 12, wherein the processor is configured to:
   based on a determination that a positive search response is not received from at least one of the nodes of the identified subset of nodes:
      initiate, toward a next node associated with a next entry of the collection of entries that is not in the identified subset of nodes, a subsequent service search request for locating the service within the P2P network.

18. The apparatus of claim 17, wherein the processor si configured to:
   determine, based on the on the search range size for use by the first node in searching for the service within the P2P network, a search range for use by the next node toward which the service search request is initiated.

19. The apparatus of claim 12, wherein the processor is configured to:
   based on a determination that the first node receives a positive search response indicative that a node supporting the service has been located, initiate a request for the service from the first node toward the node supporting the service.

20. A non-transitory computer-readable storage medium storing instructions which, when executed by a computer, cause the computer to perform a method for searching for a service within a peer-to-peer (P2P) network comprising a plurality of nodes, the method comprising:
   detecting, at a first node of the P2P network, a request to search for a service within the P2P network, wherein the first node comprises a collection of entries identifying a plurality of nodes of the P2P network;
   determining, based on an estimated average number of active nodes of the P2P network that support the service, a search range size for use by the first node in searching for the service within the P2P network;
   determining, based on the search range size, a first search range for use by the first node in searching for the service within the P2P network, wherein the first search range specifies a first range of node identifiers of the P2P network;
   identifying, from the collection of entries based on the first search range, an identified subset of nodes comprising a subset of the nodes of the P2P network identified in the collection of entries; and
   initiating a service search request from the first node toward a selected node of the identified subset of nodes, wherein the service search request is a request to identify at least one node of the P2P network that supports the service, wherein the service search request comprises information indicative of the service and a second search range for use by the selected node to search for the service within the P2P network, wherein the second search range specifies a second range of node identifiers of the P2P network.

21. The non-transitory computer-readable storage medium of claim 20, wherein determining the search range size for use by the first node in searching for the service within the P2P network is further based on a probability related to success of a search for the service within the P2P network.

22. The non-transitory computer-readable storage medium of claim 20, wherein determining the search range size for use by the first node in searching for the service within the P2P network is based on $(L-1)*\ln(1-a)<\ln(1/b)$, wherein:
   "a" is a probability that an active node supports the service;
   "b" is a probability that a search for the service is negative; and
   L is the search range size for use by the first node in searching for the service.

23. The non-transitory computer-readable storage medium of claim 20, wherein identifying the identified subset of nodes from the collection of entries based on the first search range comprises:
   identifying, from the collection of entries, one or more of the entries falling within the first search range.

24. The non-transitory computer-readable storage medium of claim 20, wherein the identified subset of nodes comprises multiple nodes from the collection of entries, the method further comprising:
   initiating multiple service search requests from the first node toward the respective multiple nodes from the collection of entries in parallel.

25. The non-transitory computer-readable storage medium of claim 20, the method further comprising:
   based on a determination that a positive search response is not received from at least one of the nodes of the identified subset of nodes:
      initiating, toward a next node associated with a next entry of the collection of entries that is not in the identified subset of nodes, a subsequent service search request for locating the service within the P2P network.

26. The non-transitory computer-readable storage medium of claim 25, the method further comprising:
   determining, based on the on the search range size for use by the first node in searching for the service within the P2P network, a search range for use by the next node toward which the service search request is initiated.

27. The non-transitory computer-readable storage medium of claim 20, the method further comprising:
   based on a determination that the first node receives a positive search response indicative that a node supporting the service has been located, initiating a request for the service from the first node toward the node supporting the service.

* * * * *